(12) United States Patent
Lee et al.

(10) Patent No.: US 12,211,422 B2
(45) Date of Patent: Jan. 28, 2025

(54) DISPLAY DEVICE CAPABLE OF REDUCING THE NUMBER OF READOUT WIRES FOR RECEIVING A BIOMETRIC SENSING SIGNAL

(71) Applicant: Samsung Display Co., LTD., Yongin-si (KR)

(72) Inventors: Seungchan Lee, Yongin-si (KR); Raeyoung Gwak, Yongin-si (KR); Sanghyun Jun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/375,530

(22) Filed: Oct. 1, 2023

(65) Prior Publication Data

US 2024/0257698 A1 Aug. 1, 2024

(30) Foreign Application Priority Data

Jan. 30, 2023 (KR) ........................ 10-2023-0012094

(51) Int. Cl.
*G09G 3/3233* (2016.01)
*G06F 3/041* (2006.01)
*G06F 21/32* (2013.01)
*G06V 40/13* (2022.01)
*G09G 3/20* (2006.01)

(52) U.S. Cl.
CPC ....... *G09G 3/2096* (2013.01); *G06F 3/04164* (2019.05); *G06F 3/04182* (2019.05); *G06F 21/32* (2013.01); *G06V 40/1318* (2022.01); *G09G 3/3233* (2013.01); *G09G 2310/061* (2013.01); *G09G 2354/00* (2013.01); *G09G 2360/14* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2360/14; G06F 3/041; G06F 3/0412; G06F 3/0414; G06F 3/043; G06F 3/045; G06F 3/046; G06F 3/047; G06F 3/048
USPC ..................................... 345/76–83, 173–179
See application file for complete search history.

(56) References Cited

U.S. PATENT DOCUMENTS 10,440,790 B2 10/2019 Dunn et al.
10,885,304 B2 1/2021 Huang
(Continued)

FOREIGN PATENT DOCUMENTS

KR 101739348 B1 5/2017
KR 1020220137194 A 10/2022

*Primary Examiner* — Ke Xiao
*Assistant Examiner* — Nelson Lam
(74) *Attorney, Agent, or Firm* — CANTOR COLBURN LLP

(57) ABSTRACT

A display device includes: a display layer and a sensor layer, which senses an external input. The display layer includes: a plurality of pixels and a plurality of sensors, each of which includes a sensing element and a sensor driving circuit connected to the sensing element. The sensor driving circuit includes: a reset transistor, an output transistor, and a switch transistor including a first electrode connected to the sub-readout line, a second electrode connected to a readout line, and a third electrode for receiving a switch signal generated based on the external input.

19 Claims, 17 Drawing Sheets

(56) References Cited

U.S. PATENT DOCUMENTS

| | | | |
|---|---|---|---|
| 11,158,258 B2* | 10/2021 | Cha | G06V 40/1318 |
| 11,783,620 B2* | 10/2023 | Lee | G06V 40/1318 |
| | | | 345/214 |
| 12,067,942 B2* | 8/2024 | Lee | G06V 40/1318 |
| 12,067,946 B2* | 8/2024 | Kim | G09G 3/2092 |
| 2010/0097334 A1* | 4/2010 | Choi | G06F 3/0412 |
| | | | 345/173 |
| 2011/0164011 A1* | 7/2011 | Yamamoto | G09G 3/3233 |
| | | | 345/207 |
| 2012/0262384 A1* | 10/2012 | Kim | G06F 3/04184 |
| | | | 345/173 |
| 2013/0112886 A1* | 5/2013 | Shin | H01L 27/14614 |
| | | | 250/214 R |
| 2016/0132713 A1* | 5/2016 | Bae | H10K 59/65 |
| | | | 345/174 |
| 2018/0374424 A1* | 12/2018 | In | H10K 50/805 |
| 2021/0158751 A1* | 5/2021 | Cha | H10K 65/00 |
| 2022/0050574 A1* | 2/2022 | Saitoh | G06F 3/04166 |
| 2022/0317852 A1 | 10/2022 | Park et al. | |
| 2023/0075463 A1* | 3/2023 | Lee | G09G 3/3233 |
| 2023/0316801 A1* | 10/2023 | Kim | G09G 3/3233 |
| | | | 345/206 |
| 2023/0320111 A1* | 10/2023 | Lee | H10K 39/34 |
| | | | 345/206 |

* cited by examiner

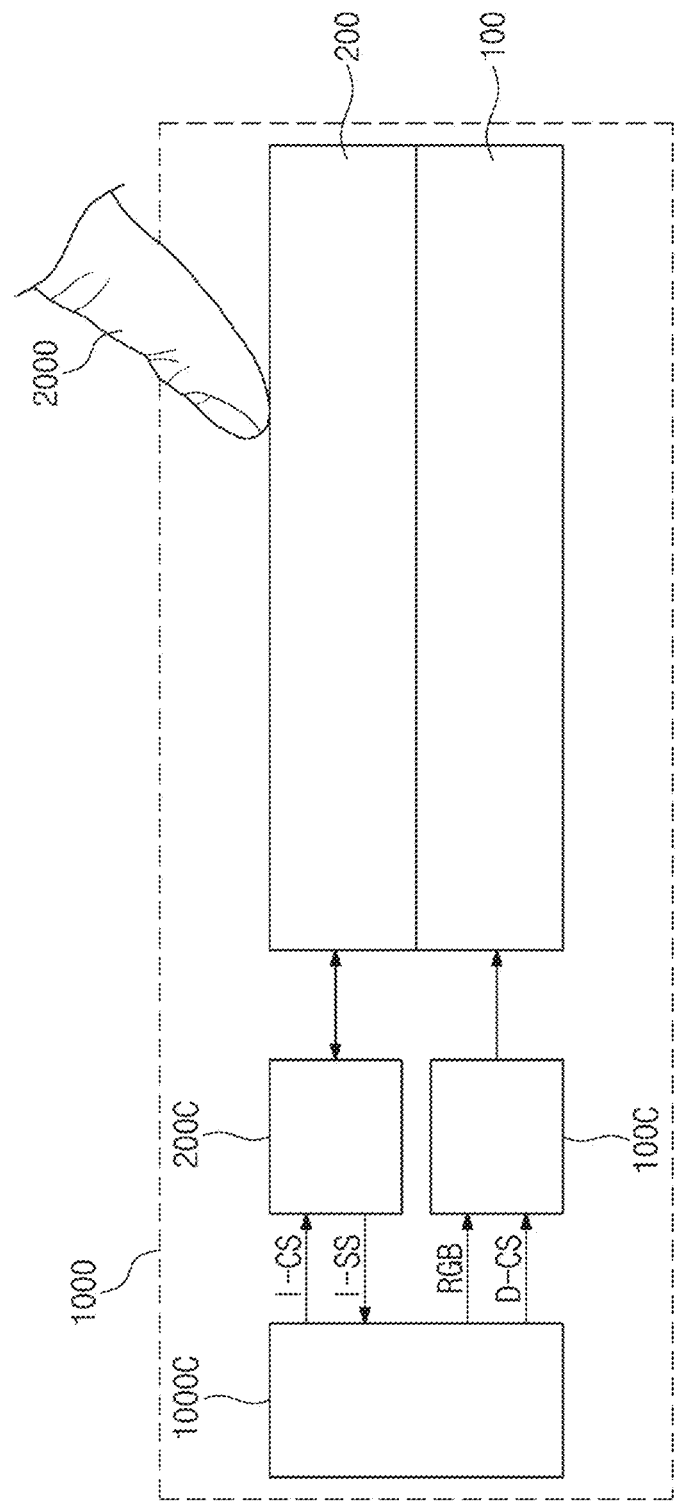

DISPLAY DEVICE CAPABLE OF REDUCING THE NUMBER OF READOUT WIRES FOR RECEIVING A BIOMETRIC SENSING SIGNAL

This application claims priority to Korean Patent Application No. 10-2023-0012094, filed on Jan. 30, 2023, and all the benefits accruing therefrom under 35 U.S.C. § 119, the content of which in its entirety is herein incorporated by reference.

BACKGROUND

Embodiments of the present disclosure described herein relate to a display device capable of recognizing biometric information, and a method for driving the display device.

A display device provides various functions to provide information to a user by displaying an image or to communicate organically with the user, such as detecting a user input. Nowadays, the display device include a function to detect the user's biometric information.

Biometric information recognition schemes include a capacitive scheme that detects a change in capacitance between electrodes, an optical scheme that detects incident light by using an optical sensor, and an ultrasonic scheme that detects vibration by using a piezoelectric material or the like.

SUMMARY

Embodiments of the present disclosure provide a display device capable of reducing the number of readout wires for receiving a biometric sensing signal including biometric information of an external input, and a method for driving the display device.

According to an embodiment, a display device includes: a display layer and a sensor layer configured to sense an external input and disposed on the display layer. The display layer includes: a plurality of pixels, each of which includes a light emitting element and a pixel driving circuit connected to the light emitting element; and a plurality of sensors, each of which includes a sensing element and a sensor driving circuit connected to the sensing element. The sensor driving circuit includes: a reset transistor including a first electrode for receiving a reset voltage, a second electrode connected to a first sensing node, and a third electrode for receiving a first scan signal; an amplification transistor including a first electrode for receiving a first driving voltage, a second electrode connected to a second sensing node, and a third electrode connected to the first sensing node; an output transistor including a first electrode connected to the second sensing node, a second electrode connected to a sub-readout line, and a third electrode for receiving a second scan signal; and a switch transistor including a first electrode connected to the sub-readout line, a second electrode connected to a readout line, and a third electrode for receiving a switch signal generated based on the external input.

The sensor layer may include a plurality of first sensing electrodes and a plurality of second sensing electrodes crossing the plurality of first sensing electrodes. The display device may further include a sensor controller configured to drive the sensor layer and including a signal generation circuit configured to transmit a transfer signal to the plurality of first sensing electrodes, an input detection circuit configured to receive a sensing signal from the plurality of second sensing electrodes, and a sensor control circuit.

The sensor controller may generate the switch signal based on the sensing signal. The sensor controller may output the switch signal to the switch transistor.

The sensor controller may sense the external input based on the sensing signal. In a plan view, the switch transistor included in each of sensors, which overlap the external input, from among the plurality of sensors may be turned on in response to the switch signal.

In the plan view, the switch transistor included in each of sensors, which do not overlap the external input, from among the plurality of sensors may be turned off in response to the switch signal.

The display device may further include a driving controller that drives the display layer. The driving controller may control pixels, which overlap the external input, of the plurality of pixels to emit light.

The display layer may further include: a fingerprint controller electrically connected to the plurality of sensors and a multiplexer connected between the plurality of readout lines and the fingerprint controller.

An active area, in which the plurality of pixels is disposed, and a peripheral area adjacent to the active area may be defined in the display layer. The display device may further include a sensing circuit disposed in the peripheral area. The sensing circuit may generate the switch signal based on the sensing signal. The sensing circuit may output the switch signal to the switch transistor.

The pixel driving circuit may include: a first transistor connected between the light emitting element and a first driving voltage line for receiving the first driving voltage; a second transistor connected between a data line and a first electrode of the first transistor and for receiving a third scan signal; a third transistor connected between a second electrode of the first transistor and a first node and for receiving the first scan signal; and a fourth transistor connected between the first node and an initialization voltage line and receiving the second scan signal. The third transistor and the fourth transistor may have a transistor type different from a transistor type of the first transistor and the second transistor.

The reset transistor may have a transistor type the same as the transistor type of the third transistor and the fourth transistor.

Each of the third transistor, the fourth transistor, and the reset transistor may be an NMOS transistor. Each of the first transistor, the second transistor, the amplification transistor, and the output transistor may be a PMOS transistor.

Each of the third transistor, the fourth transistor, and the reset transistor may be an oxide semiconductor transistor. Each of the first transistor, the second transistor, the amplification transistor, and the output transistor may be a low-temperature polycrystalline silicon ("LTPS") transistor.

The light emitting element may be an organic light emitting diode. The sensing element may be an organic photodiode.

The readout line may be electrically connected to the sub-readout line of each of at least two sensors among the plurality of sensors.

According to an embodiment, a driving method of a display device includes: providing a display device including a display layer including a plurality of pixels and a plurality of sensors, a sensor layer disposed on the display layer, a sensor controller configured to drive the sensor layer, and a fingerprint controller; sensing, by the sensor layer, an external input; sensing, by the sensor controller, a location of the external input; generating, by the sensor controller, a switch signal based on the location; outputting, by the sensor controller, the switch signal to the plurality of sensors;

electrically connecting a part of the plurality of sensors to the fingerprint controller based on the switch signal; and obtaining, by the part of the plurality of sensors, biometric information of the external input.

Each of the plurality of sensors may include a sensing element and a sensor driving circuit connected to the sensing element. The sensor driving circuit may include: a reset transistor including a first electrode for receiving a reset voltage, a second electrode connected to a first sensing node, and a third electrode for receiving a first scan signal; an amplification transistor including a first electrode for receiving a first driving voltage, a second electrode connected to a second sensing node, and a third electrode connected to the first sensing node; an output transistor including a first electrode connected to the second sensing node, a second electrode connected to a sub-readout line, and a third electrode for receiving a second scan signal; and a switch transistor including a first electrode connected to the sub-readout line, a second electrode connected to a readout line, and a third electrode for receiving the switch signal.

the obtaining of the biometric information may include: a sensor initialization step in which the reset transistor is turned on; a sensor active step in which the sensing element receives light reflected from the external input; and a sensor sensing step in which the amplification transistor and the output transistor are turned on and a biometric sensing signal is provided to the readout line.

The electrically connecting of the part of the plurality of sensors to the fingerprint controller may include turning on the switch transistor included in each of sensors, which overlap the external input, from among the plurality of sensors in response to the switch signal in a plan view.

The sensor layer may include a plurality of first sensing electrodes and a plurality of second sensing electrodes crossing the plurality of first sensing electrodes. The sensing, by the sensor layer, of the external input may include transmitting a transfer signal to the plurality of first sensing electrodes and receiving a sensing signal from the plurality of second sensing electrodes.

The sensing, by the sensor controller, of the location of the external input may include calculating the location based on the sensing signal.

BRIEF DESCRIPTION OF THE FIGURES

The above and other aspects and features of the present disclosure will become apparent by describing in detail embodiments thereof with reference to the accompanying drawings.

FIG. 3 is a block diagram illustrating an operation of a display device, according to an embodiment of the present disclosure.

DETAILED DESCRIPTION

Figure 1:
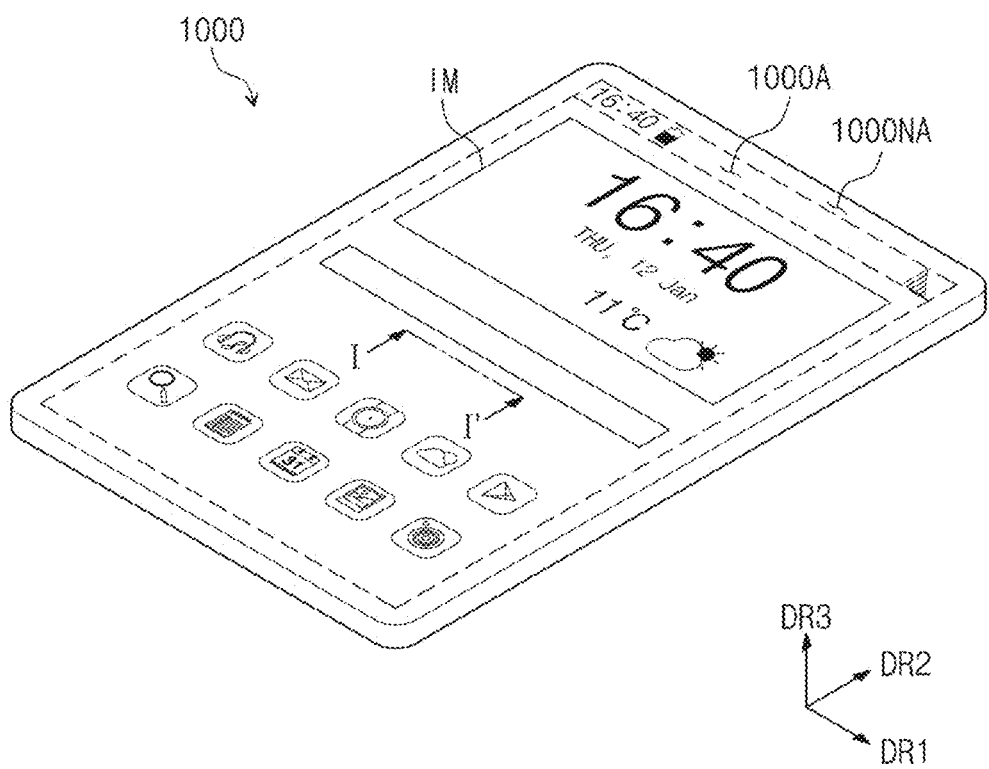
FIG. 1 is a perspective view of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. In an embodiment, for example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device, according to an embodiment of the present disclosure.

Referring to FIG. 1, in this specification, a display device 1000 capable of being applied to a mobile phone terminal is illustrated. Although not illustrated in drawings, the mobile phone terminal may be implemented by positioning electronic modules, a camera module, a power module, or the like, which are mounted on a main board, in a bracket or a case together with the display device 1000. However, this is an example, and the display device 1000 according to an embodiment of the present disclosure is not limited thereto. In another embodiment, for example, the display device 1000 may be applied to a small and medium-sized display device, such as a tablet PC, a vehicle navigation system, a game console, a smart watch, or the like as well as a large-sized display device, such as a television, a monitor, or the like.

An active area 1000A and a peripheral area 1000NA may be defined in the display device 1000. The display device 1000 may display an image IM through the active area 1000A. Icon images are illustrated as an example of the image IM. The active area 1000A may be parallel to a plane defined by a first direction DR1 and a second direction DR2. The normal direction (i.e., the thickness direction of the display device 1000) of the active area 1000A may be defined as a third direction DR3. In the specification, "when viewed from above a plane", "on a plane" or "in a plan view" may mean "when viewed in the third direction DR3". A front surface (or an upper surface) and a back surface (or a lower surface) of each layer or unit described later may be divided by the third direction DR3.

The peripheral area 1000NA may be adjacent to the active area 1000A. The peripheral area 1000NA may be an area in which the image IM is not displayed. However, it is not limited thereto. In another embodiment, the peripheral area 1000NA may be adjacent to one side of the active area 1000A or may be omitted.

Figure 2:
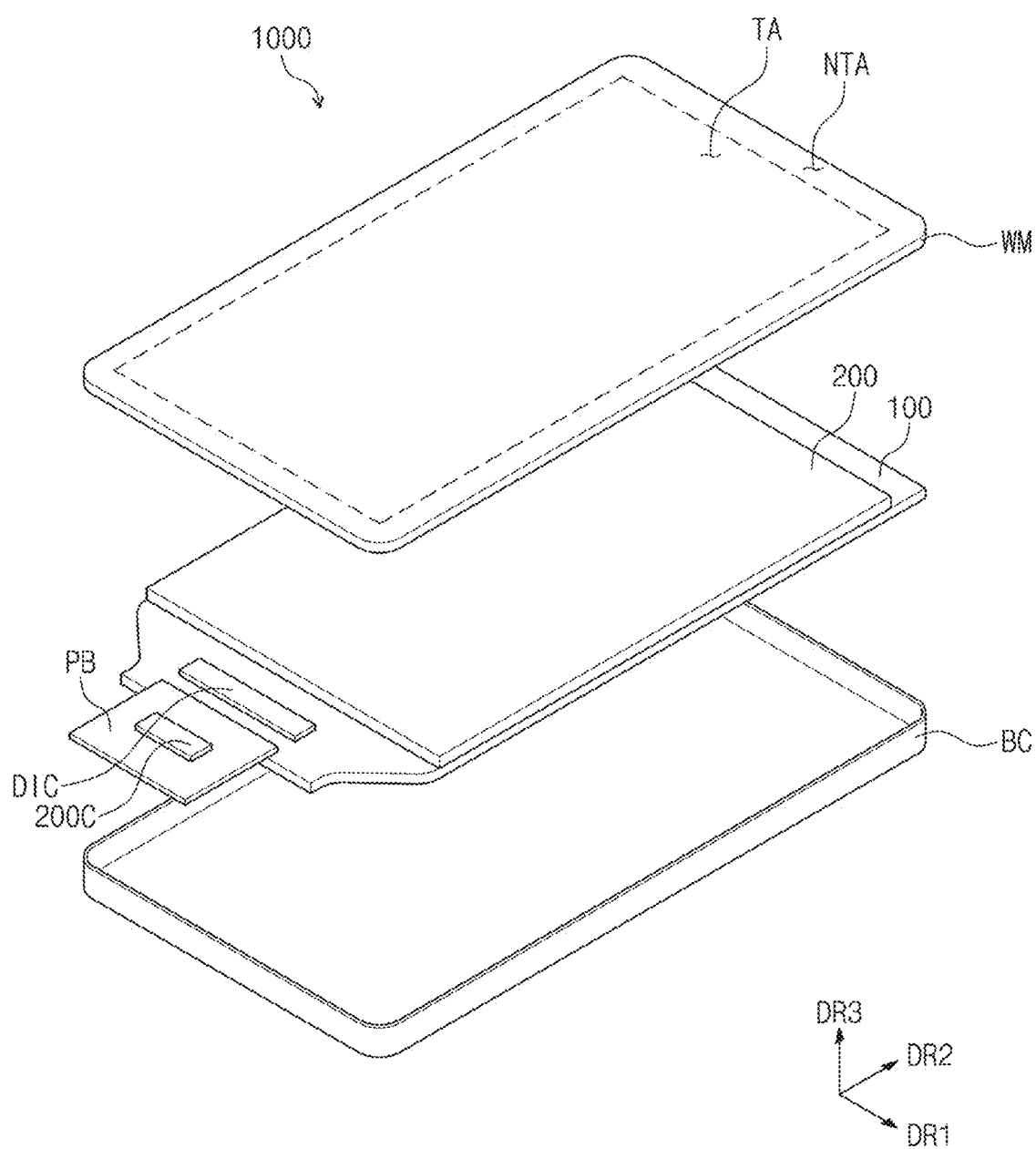
FIG. 2 is an exploded perspective view of a display device, according to an embodiment of the present disclosure.

FIG. 2 is an exploded perspective view of a display device, according to an embodiment of the present disclosure.

Referring to FIG. 2, the display device 1000 may include a window WM, a display layer 100, a sensor layer 200, a data driver DIC, a circuit board PB, a sensor controller 200C, and a receiving member BC.

The window WM may be disposed on the sensor layer 200. The window WM may transmit an image provided from the display layer 100 to the outside. The window WM may include a transmission area TA and a non-transmission area NTA. The transmission area TA may overlap the active area 1000A (see FIG. 1) of the display device 1000 in a plan view. The transmission area TA may have a shape corresponding to the active area 1000A (see FIG. 1). The image IM (see FIG. 1) displayed on the active area 1000A (see FIG. 1) of the display device 1000 may be visible from the outside through the transmission area TA of the window WM.

The non-transmission area NTA may overlap the peripheral area 1000NA (see FIG. 1) of the display device 1000 in a plan view. The non-transmission area NTA may have a shape corresponding to the peripheral area 1000NA (see FIG. 1). The non-transmission area NTA may be an area having lower light transmittance than the transmission area TA. However, the window WM according to an embodiment of the present disclosure is not limited thereto, and the non-transmission area NTA may be omitted in another embodiment.

The window WM may be formed of glass, sapphire, plastic, etc. Moreover, the window WM may be composed of a single layer or a plurality of layers. The window WM may include at least one printed layer that overlaps a base layer and the non-transmission area NTA and disposed on the back surface of the base layer in a plan view. The printed layer may have a given color. In an embodiment, for example, the printed layer may be provided in black or in a color other than black.

The display layer 100 and the sensor layer 200 may be interposed between the window WM and the receiving member BC. The sensor layer 200 may be disposed on the display layer 100. This will be described later.

The data driver DIC may be mounted on the display layer 100. The circuit board PB is disposed at one end of the display layer 100 and may be electrically connected to the display layer 100. The circuit board PB may be rigid or flexible. In an embodiment, for example, when the circuit board PB is flexible, the circuit board PB may be provided as a flexible printed circuit board. The circuit board PB may include the sensor controller 200C that controls the operation of the sensor layer 200. The sensor controller 200C may be mounted on the circuit board PB in a form of an integrated chip. Moreover, although not shown in drawings, the circuit board PB may further include circuits for controlling the display layer 100.

FIG. 3 is a block diagram illustrating an operation of a display device, according to an embodiment of the present disclosure.

Referring to FIG. 3, the display device 1000 may include the display layer 100, the sensor layer 200, a driving controller 100C, the sensor controller 200C, and a main driver 1000C.

The display layer 100 may be a component that substantially generates an image. The display layer 100 may be a light emitting display layer. In an embodiment, for example, the display layer 100 may be an organic light emitting display layer, a quantum dot display layer, a micro-LED display layer, or a nano-LED display layer. The display layer 100 may be referred to as a "display panel".

The sensor layer 200 may be disposed on the display layer 100. The sensor layer 200 may sense an external input 2000 applied from the outside. The external input 2000 may include any input means capable of providing a change in capacitance. In an embodiment, for example the sensor layer 200 may sense not only a passive-type input means such as a user's body, but also an input by an active-type input means that provides a transfer signal. The sensor layer 200 may be referred to as a "sensor", "touch layer", "touch panel", "input sensing layer", or "input sensing panel".

The main driver 1000C may control overall operations of the display device 1000. In an embodiment, for example, the main driver 1000C may control operations of the driving controller 100C and the sensor controller 200C. The main driver 1000C may include at least one microprocessor, and the main driver 1000C may be referred to as a "host". The main driver 1000C may further include a graphic controller.

The driving controller 100C may drive the display layer 100. The driving controller 100C may receive image data RGB and a control signal D-CS from the main driver 1000C. The control signal D-CS may include various signals. In an embodiment, for example, the control signal D-CS may include an input vertical synchronization signal, an input horizontal synchronization signal, a main clock, and a data enable signal. The driving controller 100C may generate a scan control signal and a data control signal for controlling the driving of the display layer 100 based on the control signal D-CS.

The sensor controller 200C may drive the sensor layer 200. The sensor controller 200C may receive a control signal I-CS from the main driver 1000C. The control signal I-CS may include a clock signal of the sensor layer 200.

The sensor controller 200C may calculate coordinate information of an input based on a signal received from the sensor layer 200 and may provide the main driver 1000C with a coordinate signal I-SS having the coordinate information. The main driver 1000C executes an operation corresponding to a user input based on the coordinate signal I-SS. In an embodiment, for example, the main driver 1000C may operate the driving controller 100C to display a new application image on the display layer 100.

Figure 4A:
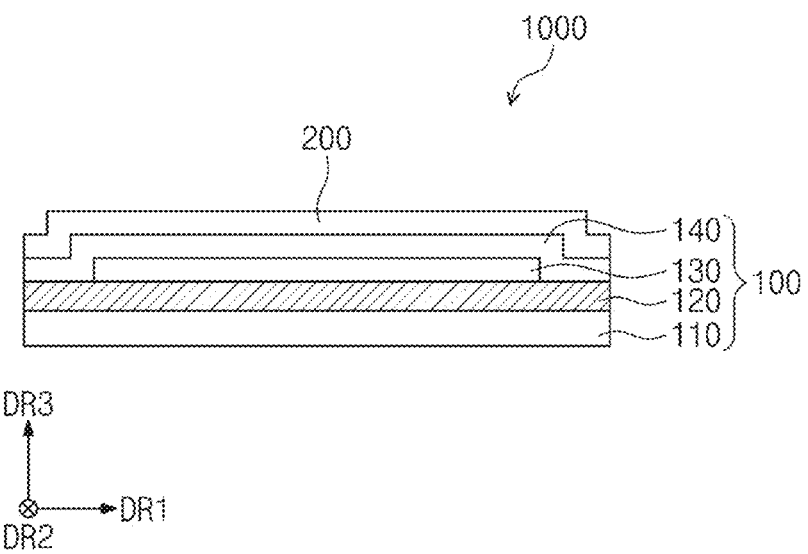
FIG. 4A is a cross-sectional view of a display device, according to an embodiment of the present disclosure.

FIG. 4A is a cross-sectional view of a display device, according to an embodiment of the present disclosure.

Referring to FIG. 4A, the display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, a polymer substrate, or the like. However, an embodiment is not limited thereto, and the base layer 110 may be an inorganic layer, an organic layer, or a composite material layer in another embodiment.

The base layer 110 may have a multi-layer structure. In an embodiment, for example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the meantime, "~~"-based resin in the specification means including the functional group of "~~".

The circuit layer 120 may be disposed on the base layer 110. The circuit layer 120 may include an insulating layer, a semiconductor pattern, a conductive pattern, and a signal wire. The insulating layer, the semiconductor layer, and the conductive layer may be formed on the base layer 110 in a manner such as coating, evaporation, or the like. Afterward, the insulating layer, the semiconductor layer, and the conductive layer may be selectively patterned by performing a photolithography process multiple times. Afterward, the semiconductor pattern, the conductive pattern, and the signal wire included in the circuit layer 120 may be formed.

The light emitting element layer 130 may be disposed on the circuit layer 120. The light emitting element layer 130 may include a light emitting element. In an embodiment, for example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be disposed on the display layer 100. The sensor layer 200 may sense an external input applied from the outside. The external input may be a user input. The user input may include various types of external inputs such as a part of a user body, light, heat, a pen, or pressure.

The sensor layer 200 may be formed on the display layer 100 through a successive process. In this case, the sensor layer 200 may be expressed as being directly disposed on the display layer 100. "Being directly disposed" may mean that the third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a common adhesive or a common sticking agent.

Although not illustrated in drawings, the display device 1000 may further include an anti-reflection layer and an optical layer, which are disposed on the sensor layer 200. The anti-reflection layer may reduce the reflectance of external light incident from the outside of the display device 1000. The optical layer may improve the front luminance of the display device 1000 by controlling a direction of light incident from the display layer 100.

Figure 4B:
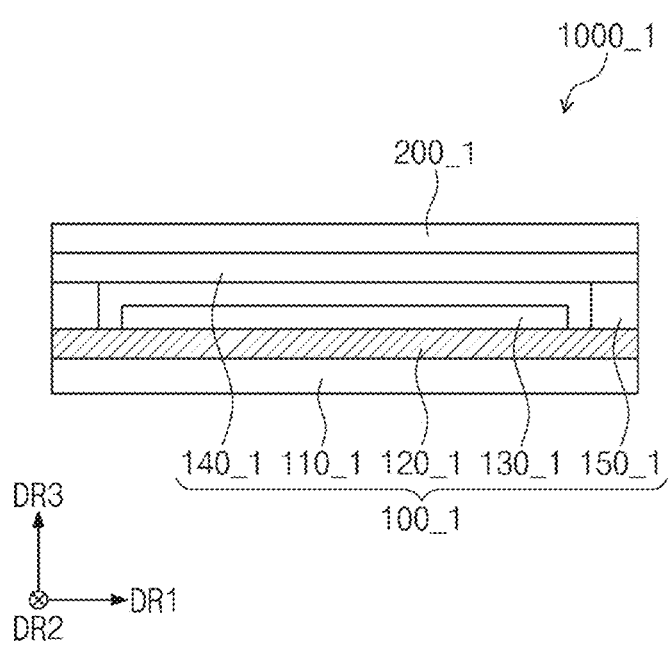
FIG. 4B is a cross-sectional view of a display device, according to an embodiment of the present disclosure.

FIG. 4B is a cross-sectional view of a display device, according to an embodiment of the present disclosure.

Referring to FIG. 4B, a display device 1000_1 may include a display layer 100_1 and a sensor layer 200_1. The display layer 100_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may be a glass substrate, a metal substrate, or a polymer substrate, but is not particularly limited thereto.

The coupling member 150_1 may be interposed between the base substrate 110_1 and the encapsulation substrate 140_1. The coupling member 150_1 may couple the encapsulation substrate 140_1 to the base substrate 110_1 or the circuit layer 120_1. The coupling member 150_1 may include an inorganic material or an organic material. In an embodiment, for example, the inorganic material may include a frit seal, and the organic material may include a photo-curable resin or a photo-plastic resin. However, the material constituting the coupling member 150_1 is not limited to the example.

The sensor layer 200_1 may be directly disposed on the encapsulation substrate 140_1. "Being directly disposed" may mean that the third component is not interposed between the sensor layer 200_1 and the encapsulation substrate 140_1. That is, a separate adhesive member may not be interposed between the sensor layer 200_1 and the display layer 100_1. However, an embodiment is not limited thereto, and an adhesive layer may be further interposed between the sensor layer 200_1 and the encapsulation substrate 140_1 in another embodiment.

Figure 5:
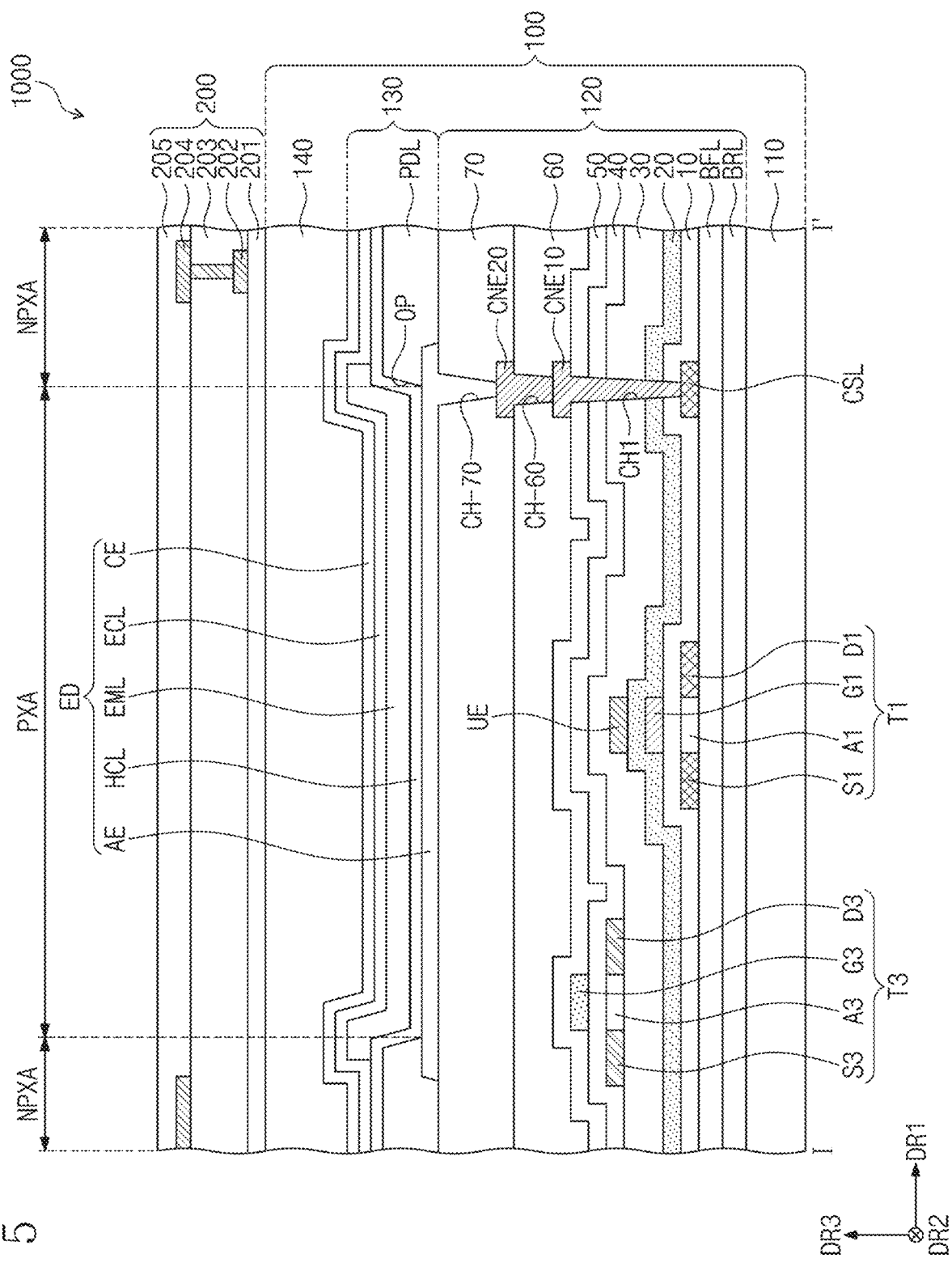
FIG. 5 is a cross-sectional view of a display device taken along line I-I' of FIG. 1, according to an embodiment of the present disclosure.

FIG. 5 is a cross-sectional view of a display device taken along line I-I' of FIG. 1, according to an embodiment of the present disclosure.

Referring to FIG. 5, the display device 1000 may include the display layer 100 and the sensor layer 200 disposed on the display layer 100.

The display layer 100 may include the base layer 110, the circuit layer 120, the light emitting element layer 130, and the encapsulation layer 140 that are disposed on the base layer 110.

The base layer 110 may include a synthetic resin layer. The synthetic resin layer may include a thermosetting resin. In detail, the synthetic resin layer may be a polyimide-based resin layer, and the material thereof is not particularly limited thereto. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin. Besides, the base layer 110 may include a glass substrate, a metal substrate, an organic/inorganic composite substrate, or the like.

At least one inorganic layer is disposed on an upper surface of the base layer 110. The inorganic layer may include at least one of aluminum oxide, titanium oxide, silicon oxide, silicon oxynitride, zirconium oxide, and hafnium oxide. The inorganic layer may be formed of multiple layers. The multi-layered inorganic layers may constitute a barrier layer BRL and/or a buffer layer BFL, which will be described later. The barrier layer BRL and the buffer layer BFL may be disposed selectively.

The barrier layer BRL prevents foreign objects from being entered from the outside. The barrier layer BRL may include a silicon oxide layer and a silicon nitride layer. Each of the silicon oxide layer and the silicon nitride layer may include a plurality of layers, and the plurality of silicon oxide layers and the silicon nitride layers may be alternately stacked.

The buffer layer BFL may be disposed on the barrier layer BRL. The buffer layer BFL improves a bonding force between the base layer 110 and a semiconductor pattern and/or a conductive pattern. The buffer layer BFL may include a silicon oxide layer and a silicon nitride layer. The silicon oxide layer and the silicon nitride layer may be alternately stacked.

The semiconductor pattern is disposed on the buffer layer BFL. Hereinafter, the semiconductor pattern directly disposed on the buffer layer BFL is defined as a first semiconductor pattern. The first semiconductor pattern may include a silicon semiconductor. The first semiconductor pattern may include polysilicon. However, an embodiment is not limited thereto. In another embodiment, for example, the first semiconductor pattern may include amorphous silicon.

The first semiconductor pattern has electrical characteristics different depending on whether the first semiconductor pattern is doped. The first semiconductor pattern may include a doped area and an undoped area. The doped area may be doped with an N-type dopant or a P-type dopant. A P-type transistor may include a doped area doped with the P-type dopant, and an N-type transistor includes a doped area doped with the N-type dopant.

The doped area has higher conductivity than the undoped area, and substantially operates as an electrode or signal line. The undoped area substantially corresponds to the active area (or channel) of a transistor. In other words, a part of the first semiconductor pattern may be an active area of a transistor. Another part thereof may be a source or drain of the transistor. Another part thereof may be a connection signal line (or a connection electrode). FIG. 5 shows a first transistor T1 as an example of a first semiconductor pattern.

A first electrode S1, a channel part A1, and a second electrode D1 of the first transistor T1 are formed from the first semiconductor pattern. The first electrode S1 and the second electrode D1 of the first transistor T1 may extend in opposite directions from the channel part A1.

A portion of a connection signal line CSL formed from the semiconductor pattern is illustrated in FIG. 5. Although not separately illustrated in drawings, the connection signal line CSL may be electrically connected to the second electrode of the sixth transistor T6 (see FIG. 7) on a plane.

A first insulating layer 10 is disposed on the buffer layer BFL. The first insulating layer 10 overlaps the plurality of pixels PX (see FIG. 6) in common so as to cover the first semiconductor pattern in a plan view. The first insulating layer 10 may be an inorganic layer and/or an organic layer, and may have a single layer or multi-layer structure. The first insulating layer 10 may include at least one of an aluminum oxide, a titanium oxide, a silicon oxide, a silicon oxynitride, a zirconium oxide, and a hafnium oxide. In an embodiment, the first insulating layer 10 may be a silicon oxide layer having a single layer structure. Not only the first insulating layer 10 but also an insulating layer of the circuit layer 120 to be described later may be an inorganic layer and/or an organic layer, and may have a single layer structure or a multi-layer structure. The inorganic layer may include at least one of the materials described above.

A third electrode G1 of the first transistor T1 is disposed on the first insulating layer 10. The third electrode G1 may be a portion of a metal pattern. The third electrode G1 of the first transistor T1 overlaps the channel part A1 of the first transistor T1 in a plan view. In a process of doping the first semiconductor pattern, the third electrode G1 of the first transistor T1 may serve as a mask.

A second insulating layer 20 covering the third electrode G1 is disposed on the first insulating layer 10. The second insulating layer 20 overlaps a plurality of pixels PX (see FIG. 6) in common in a plan view. The second insulating layer 20 may be an inorganic layer and/or an organic layer, and may have a single layer structure or a multi-layer structure. In an embodiment, the second insulating layer 20 may be a silicon oxide layer having a single layer structure.

An upper electrode UE may be disposed on the second insulating layer 20. The upper electrode UE may overlap the third electrode G1 in a plan view. The upper electrode UE may be a portion of a metal pattern or a portion of a doped semiconductor pattern. A portion of the third electrode G1 and the upper electrode UE overlapping the portion of the third electrode G1 in a plan view may define a capacitor Cst (see FIG. 7). In an embodiment of the present disclosure, the upper electrode UE may be omitted.

In an embodiment of the present disclosure, the second insulating layer may be replaced with an insulating pattern. The upper electrode UE is arranged on the insulating pattern. The upper electrode UE may serve as a mask for forming an insulating pattern from the second insulating layer 20.

A third insulating layer 30 covering the upper electrode UE is disposed on the second insulating layer 20. In an embodiment, the third insulating layer 30 may be a silicon oxide layer having a single layer structure. A semiconductor pattern is arranged on the third insulating layer 30. Hereinafter, the semiconductor pattern directly disposed on the third insulating layer 30 is defined as a second semiconductor pattern. The second semiconductor pattern may include metal oxide. The oxide semiconductor may include a crystalline or amorphous oxide semiconductor. In an embodiment, for example, the oxide semiconductor may include oxides of metals (e.g., zinc (Zn), indium (In), gallium (Ga), tin (Sn), titanium (Ti), or the like) or a mixture of the metals (e.g., zinc (Zn), indium (In), gallium (Ga), tin (Sn), titanium (Ti), and the like) and oxides of the metals. The oxide semiconductors may include indium-tin oxide ("ITO"), indium-gallium-zinc oxide ("IGZO"), zinc oxide (ZnO), indium-zinc oxide ("IZO"), zinc-indium oxide ("ZIO"), indium oxide (InO), titanium oxide (TiO), indium-zinc-tin oxide ("IZTO"), zinc-tin oxide ("ZTO"), or the like.

The second semiconductor pattern may include a plurality of areas identified depending on whether the metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially has a role of an electrode or signal line. The non-reduction area substantially corresponds to a channel part of a transistor. In other words, the portion of the second semiconductor pattern may be a channel part of a transistor, and another portion thereof may be a first electrode or a second electrode of the transistor. FIG. 5 shows a third transistor T3 as an example of a second semiconductor pattern.

A first electrode S3, a channel part A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may have a predetermined thickness from an upper surface of the second semiconductor pattern, and may include a metal layer including the reduced metal.

A fourth insulating layer 40 covering the second semiconductor pattern is disposed on the third insulating layer 30. In an embodiment, the fourth insulating layer 40 may be a silicon oxide layer having a single layer structure. A third electrode G3 of the third transistor T3 is disposed on the fourth insulating layer 40. The third electrode G3 may be a portion of a metal pattern. The third electrode G3 of the third transistor T3 overlaps the channel part A3 of the third transistor T3 in a plan view.

In an embodiment of the present disclosure, the fourth insulating layer may be replaced with an insulating pattern. The third electrode G3 of the third transistor T3 is disposed on the insulating pattern. In an embodiment, the third electrode G3 may have the same shape as the insulating pattern in a plan view. In an embodiment, for convenience of description, the one third electrode G3 is illustrated, but the third transistor T3 may include two third electrodes.

A fifth insulating layer 50 covering the third electrode G3 is disposed on the fourth insulating layer 40. In an embodiment, the fifth insulating layer 50 may include a silicon oxide layer and a silicon nitride layer. The fifth insulating layer 50 may include a plurality of silicon oxide layers and a plurality of silicon nitride layers, which are alternately stacked.

At least one insulating layer is further disposed on the fifth insulating layer 50. In an embodiment, a sixth insulating layer 60 and a seventh insulating layer 70 may be disposed on the fifth insulating layer 50. The sixth insulating layer 60 and the seventh insulating layer 70 may be organic layers, and may have a single layer or multi-layer structure. The sixth insulating layer 60 and the seventh insulating layer 70 may be a polyimide-based resin layer having a single layer structure. However, the present disclosure is not limited thereto. In another embodiment, for example, the sixth insulating layer 60 and the seventh insulating layer 70 may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin.

A first connection electrode CNE10 may be disposed on the fifth insulating layer 50. The first connection electrode CNE10 may be connected to the connection signal line CSL through a first contact hole CH1 penetrating the first to fifth insulating layers 10 to 50. A second connection electrode CNE20 may be connected to the first connection electrode CNE10 through a contact hole CH-60 penetrating the sixth insulating layer 60. In an embodiment of the present disclosure, at least one of the fifth insulating layer 50 and the sixth insulating layer 60 may be omitted.

The light emitting element layer 130 includes the light emitting element ED and a pixel defining layer PDL. An anode AE of the light emitting element ED is disposed on the seventh insulating layer 70. The anode AE of the light emitting element ED may be connected to the second connection electrode CNE20 through a contact hole CH-70 penetrating the seventh insulating layer 70. The light emitting element ED may include an organic light emitting diode.

An opening OP of the pixel defining layer PDL exposes at least part of the anode AE of the light emitting element ED. The opening OP of the pixel defining layer PDL may define an emission area PXA. In an embodiment, for example, the plurality of pixels PX (see FIG. 6) may be disposed on a plane of the display layer 100 (see FIG. 6) based on a specific rule. An area in which the plurality of pixels PX are disposed may be defined as a pixel area. One pixel area may include the emission area PXA and a non-emission area NPXA adjacent to the emission area PXA. The non-emission area NPXA may surround the emission area PXA.

A hole control layer HCL may be disposed in common in the emission area PXA and the non-emission area NPXA. A common layer such as the hole control layer HCL may be formed in common in the plurality of pixels PX. The hole control layer HCL may include a hole transport layer and a hole injection layer.

A light emitting layer EML is disposed on the hole control layer HCL. The light emitting layer EML may be disposed in only an area corresponding to the opening OP. The light emitting layer EML may be separately formed in each of the plurality of pixels PX.

In an embodiment, the patterned light emitting layer EML is illustrated. However, the light emitting layer EML may be disposed in the plurality of pixels PX in common. At this time, the light emitting layer EML may generate white light or blue light. Also, the light emitting layer EML may have a multi-layer structure.

An electron control layer ECL is disposed on the light emitting layer EML. The electron control layer ECL may include an electron transport layer and an electron injection layer. A cathode CE of the light emitting element ED is disposed on the electron control layer ECL. The electron control layer ECL and the cathode CE are disposed in common in the plurality of pixels PX.

The encapsulation layer 140 is disposed on the cathode CE. The encapsulation layer 140 may cover the plurality of pixels PX (see FIG. 6). In an embodiment, the encapsulation layer 140 directly covers the cathode CE. In an embodiment of the present disclosure, the display layer 100 may further include a capping layer directly covering the cathode CE. In an embodiment of the present disclosure, the stacked structure of the light emitting element ED may have a vertically inverted structure in the structure shown in FIG. 5.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, and silicon oxide. Alternatively, the base layer 201 may be an organic layer including an epoxy resin, an acrylate resin, or an imide-based resin. The base layer 201 may have a single-layer structure or may have a multi-layer structure stacked in the third direction DR3.

Each of the first conductive layer 202 and the second conductive layer 204 may have a single layer structure or may have a multi-layer structure stacked in the third direction DR3.

A conductive layer of a single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as PEDOT, a metal nano wire, graphene, and the like.

A conductive layer of the multi-layer structure may include metal layers. In an embodiment, for example, the metal layers may have a three-layer structure of titanium/ aluminum/titanium. The conductive layer of the multi-layer structure may include at least one metal layer and at least one transparent conductive layer.

At least one of the sensing insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

Figure 6:
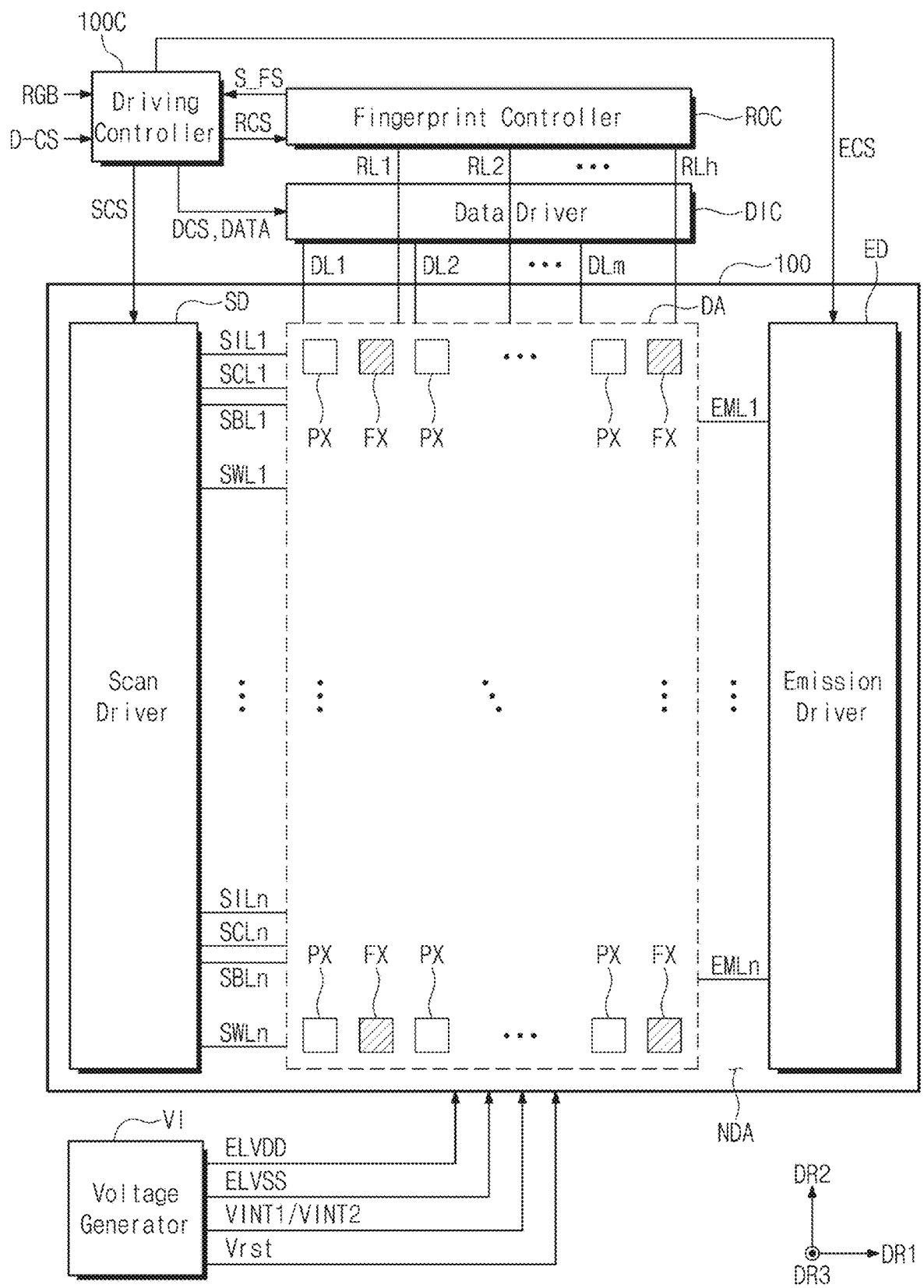
FIG. 6 is a block diagram of a display device, according to an embodiment of the present disclosure.

FIG. 6 is a block diagram of a display device, according to an embodiment of the present disclosure.

Referring to FIG. 6, the display device 1000 (see FIG. 1) may include the display layer 100, the driving controller 100C, the data driver DIC, a scan driver SD, an emission driver EDC, a voltage generator VI, and a fingerprint controller ROC.

The driving controller 100C may receive the image data RGB and the control signal D-CS. The driving controller 100C may generate image data signal DATA obtained by converting the data format of the image data RGB so as to be suitable for the interface specification of the data driver DIC. The driving controller 100C may output a first control signal SCS, a second control signal ECS, a third control signal DCS, and a fourth control signal RCS.

The scan driver SD may receive the first control signal SCS from the driving controller 100C. The scan driver SD may output scan signals to scan lines SILn, SCLn, SBLn, and SWLn in response to the first control signal SCS. The scan lines SILn, SCLn, SBLn, and SWLn may include initialization scan lines SIL1 to SILn, compensation scan lines SCL1 to SCLn, write scan lines SWL1 to SWLn, and black scan lines SBL1 to SBLn.

The emission driver EDC may receive the second control signal ECS from the driving controller 100C. The emission driver EDC may output emission control signals to the emission control lines EML1 to EMLn in response to the second control signal ECS.

The data driver DIC may receive the third control signal DCS and the image data signal DATA from the driving controller 100C. The data driver DIC may convert the image data signal DATA into data signals and may output the data signals to data lines DL1 to DLm. The data signals may be analog voltages corresponding to grayscale values of the image data signal DATA.

The voltage generator VI may generate voltages necessary for the operation of the display layer 100. In an embodiment, the voltage generator VI may generate a first driving voltage ELVDD, a second driving voltage ELVSS, a first initialization voltage VINT1, a second initialization voltage VINT2, and a reset voltage VRST. However, the voltage generated by the voltage generator VI is not limited thereto.

The display layer 100 may include the plurality of pixels PX disposed in a display area DA and a plurality of sensors FX disposed in the display area DA. When viewed from above a plane, the display area DA of the display layer 100 may overlap the active area 1000A (see FIG. 1) of the display device 1000 (see FIG. 1). In an embodiment of the present disclosure, each of the plurality of sensors FX may be interposed between the two pixels PX adjacent to each other. The pixels PX and the sensors FX may be alternately positioned in the first and second directions DR1 and DR2. However, an embodiment is not necessarily limited thereto. In an embodiment, for example, the two or more pixels PX may be positioned between the two sensors FX, which are adjacent to each other, from among the sensors FX in the first direction DR1, and the two or more pixels PX may be positioned between the two sensors FX, which are adjacent to each other, from among the sensors FX in the second direction DR2. The plurality of sensors FX may be disposed on the whole surface of the display area DA.

The initialization scan lines SIL1 to SILn, the compensation scan lines SCL1 to SCLn, the write scan lines SWL1 to SWLn, the black scan lines SBL1 to SBLn, and the emission control lines EML1 to EMLn may extend in the first direction DR1 and may be spaced from each other in the second direction DR2. The data lines DL1 to DLm and the readout lines RL1 to RLh may extend in the first direction DR1 and are arranged spaced from one another in the second direction DR2.

The plurality of pixels PX may be electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. Each of the plurality of pixels PX is electrically connected to four scan lines. However, the number of scan lines connected to each of the pixels PX is not limited thereto. In an embodiment, for example, the number of scan lines may be changed.

The plurality of sensors FX may be electrically connected to the write scan lines SWL1 to SWLn and the readout lines RL1 to RLh. It is illustrated that each of the plurality of sensors FX is electrically connected to one scan line, but is not limited thereto. In an embodiment, for example, the number of scan lines connected to each of the sensors FX may be changed. The number of the readout lines RL1 to RLh may be less than or equal to the number of the data lines DL1 to DLm. In an embodiment, for example, the number of the readout lines RL1 to RLh may correspond to ½ of the number of the data lines DL1 to DLm. In an embodiment, for example, the two sensors FX may be electrically connected to one readout line. However, this is an example. In an embodiment, for example, the number of the readout lines RL1 to RLh according to an embodiment of the present disclosure may correspond to ¼ or ⅛ of the number of the data lines DL1 to DLm.

The scan driver SD may be positioned in a peripheral area NDA of the display layer 100. In response to the first control signal SCS received from the driving controller 100C, the scan driver SD may output initialization scan signals to the initialization scan lines SIL1 to SILn and may output compensation scan signals to the compensation scan lines SCL1 to SCLn. Furthermore, in response to the first control signal SCS, the scan driver SD may output write scan signals to the write scan lines SWL1 to SWLn and may output black scan signals to the black scan lines SBL1 to SBLn. In an embodiment, the scan driver SD may include a first scan driver outputting initialization scan signals and compensation scan signals, and a second scan driver outputting write scan signals and black scan signals. However, an embodiment is not limited thereto.

The emission driver EDC may be positioned in the peripheral area NDA of the display layer 100. The emission driver EDC may output emission control signals to the emission control lines EML1 to EMLn in response to the second control signal ECS received from the driving controller 100C. In an embodiment, the scan driver SD and the emission driver EDC are shown to be distinguished from each other, but are not limited thereto. In another embodiment, for example, the scan driver SD is connected to the emission control lines EML1 to EMLn to output emission control signals, and the emission driver EDC may be omitted.

The fingerprint controller ROC may receive biometric sensing signals from the readout lines RL1 to RLh in response to the fourth control signal RCS received from the driving controller 100C. The fingerprint controller ROC may process the biometric sensing signals received from the readout lines RL1 to RLh and may provide the processed biometric sensing signals S_FS to the driving controller 100C. The driving controller 100C may recognize biometric information based on the biometric sensing signals S_FS.

According to an embodiment of the present disclosure, the biometric information may be recognized in the entire display area DA through the plurality of sensors FX positioned on the whole surface of the display area DA. Accordingly, the display device 1000 (see FIG. 1) having improved reliability may be provided.

Alternatively, the fingerprint controller ROC may receive second sensing signals from the readout lines RL1 to RLh in response to a control signal CS received from the sensor controller 200C (see FIG. 3). The fingerprint controller ROC may process second sensing signals received from the readout lines RL1 to RLh and may provide the processed second sensing signals to the sensor controller 200C (see FIG. 3). The sensor controller 200C (see FIG. 3) may recognize coordinate information of the external input 2000 (see FIG. 3) based on the second sensing signals.

Figure 7:
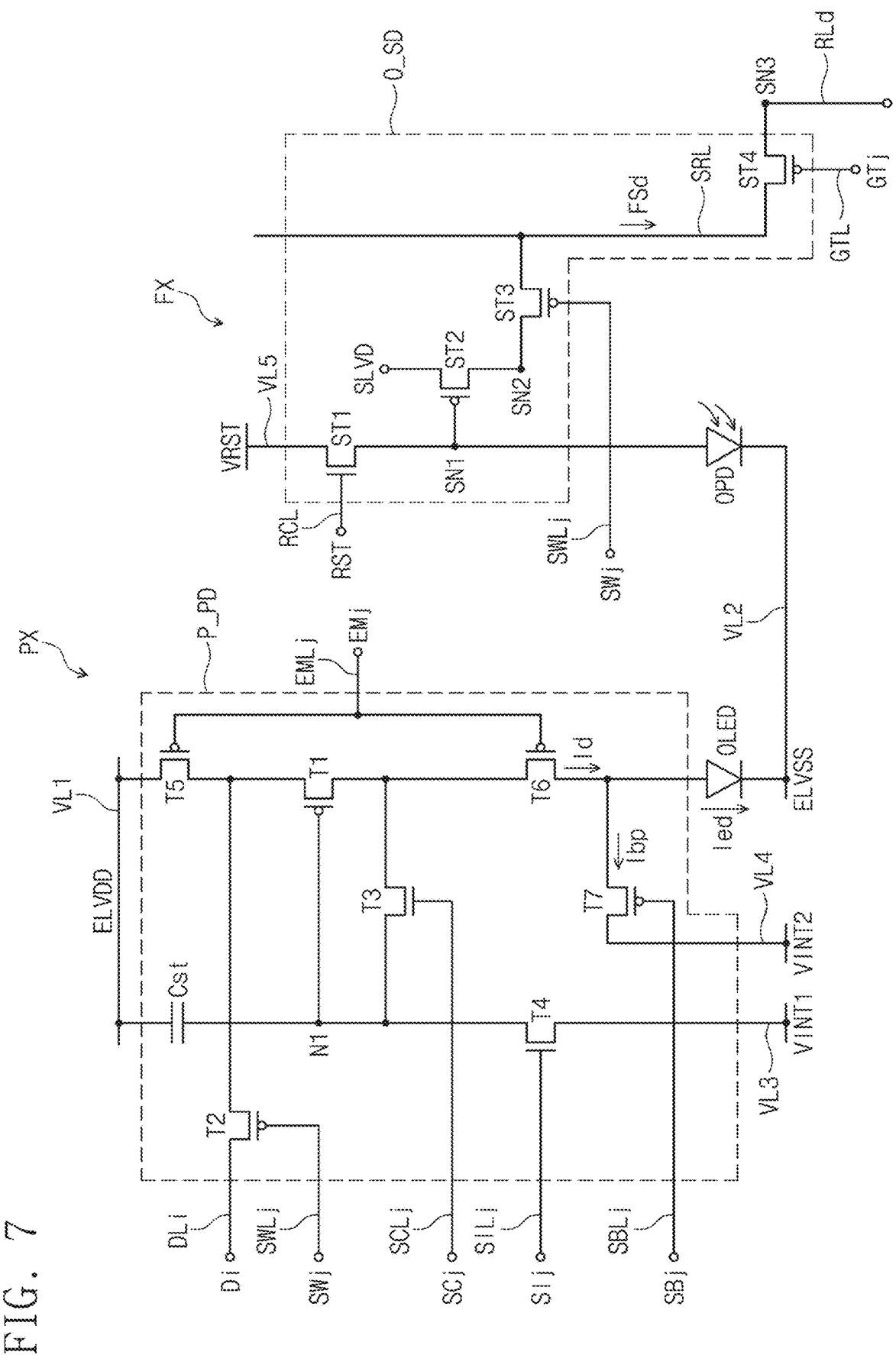
FIG. 7 is an equivalent circuit diagram of a pixel and a sensor, according to an embodiment of the present disclosure.

FIG. 7 is an equivalent circuit diagram of a pixel and a sensor, according to an embodiment of the present disclosure.

Referring to FIG. 7, the pixel PX may be connected with the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan line SWLj of the write scan lines SWL1 to SWLn, the j-th black scan line SBLj of the black scan lines SBL1 to SBLn, and the j-th emission control line EMLj of the emission control lines EML1 to EMLn. Here, each of 'i' and 'j' is a natural number.

The pixel PX may include the light emitting element ED and a pixel driving circuit P_PD. The light emitting element ED may be a light emitting diode. In an embodiment, for example, the light emitting element ED may be an organic light emitting diode including an organic light emitting layer. The pixel driving circuit P_PD may be connected to the light emitting element ED to control the amount of current flowing through the light emitting element ED. The light emitting element ED may generate light having a predetermined luminance depending on the amount of supplied current.

The pixel driving circuit P_PD may include the first to seventh transistors T1 to T7 and a capacitor Cst. Each of the first to seventh transistors T1 to T7 may be a transistor having a low-temperature polycrystalline silicon (LTPS) semiconductor layer or a transistor having an oxide semiconductor layer. Moreover, each of the first to seventh transistors T1 to T7 may be a P-type transistor or an N-type transistor. In an embodiment, for example, the first, second, fifth, sixth, and seventh transistors T1, T2, T5, T6, and T7 may be PMOS transistors, each of which has the LTPS semiconductor layer, and the third and fourth transistors T3 and T4 may be NMOS transistors, each of which has an oxide semiconductor layer. However, this is only an example, and an embodiment of the first to seventh transistors T1 to T7 is not limited thereto.

The j-th initialization scan line SILj, the j-th compensation scan line SCLj, the j-th write scan line SWLj, the j-th black scan line SBLj, and the j-th emission control line EMLj may deliver a j-th initialization scan signal SIj, a j-th compensation scan signal SCj, a j-th write scan signal SWj, a j-th black scan signal SBj, and a j-th emission control signal EMj to the pixel PX, respectively. The i-th data line DLi may deliver an i-th data signal Di to the pixel PX. The i-th data signal Di may have a voltage level corresponding to the image data RGB (see FIG. 3) input to the driving controller 100C (see FIG. 3).

First and second voltage lines VL1 and VL2 may deliver the first and second driving voltages ELVDD and ELVSS to the pixel PX, respectively. Moreover, third and fourth voltage lines VL3 and VL4 may deliver the first and second initialization voltages VINT1 and VINT2 to the pixel PX, respectively.

The light emitting element ED may include a first electrode and a second electrode. The first electrode of the light emitting element ED may be electrically connected to the first voltage line VL1 for receiving the first driving voltage ELVDD via at least one transistor. The second electrode of the light emitting element ED may be electrically connected to the second voltage line VL2 for receiving the second driving voltage ELVSS. In an embodiment, the first electrode of the light emitting element ED may correspond to an anode electrode, and the second electrode of the light emitting element ED may correspond to a cathode electrode.

Each of the first to seventh transistors T1 to T7 may include a first electrode, a second electrode, and a gate electrode. According to an embodiment of the present disclosure, the first electrode and the second electrode may be defined as an input electrode or an output electrode (or a source electrode or a drain electrode), respectively. In this specification, "being electrically connected between a transistor and a signal line or between a transistor and a transistor" means that "an electrode of the transistor is integrated with a signal line or connected through a connection electrode".

The first transistor T1 may be electrically connected between the first voltage line VL1 for receiving the first driving voltage ELVDD and the light emitting element ED. The first transistor T1 may include a first electrode connected to the first voltage line VL1 via the fifth transistor T5, a second electrode connected to the first electrode of the light emitting element ED via the sixth transistor T6, and a gate electrode connected to one end of the capacitor Cst. The first transistor T1 may receive the data signal Di delivered through the data line DLi depending on the switch operation of the second transistor T2 and then may supply a driving current Id to the light emitting element ED. In an embodiment, the first transistor T1 may be defined as a driving transistor.

The second transistor T2 may be electrically connected between the data line DLi and the first electrode of the first transistor T1. The second transistor T2 may include a first electrode connected to the data line DLi, a second electrode connected to the first electrode of the first transistor T1, and a gate electrode connected to the j-th write scan line SWLj. The second transistor T2 may be turned on in response to the write scan signal SWj transferred through the j-th write scan line SWLj and then may transfer the data signal Di transferred from the data line DLi to the first electrode of the first transistor T1. In an embodiment, the second transistor T2 may be defined as a switch transistor.

The third transistor T3 may be electrically connected between the second electrode of the first transistor T1 and a first node N1 connected to the gate electrode of the first transistor T1. The third transistor T3 may include a first electrode connected to the first node N1, a second electrode connected to the second electrode of the first transistor T1, and a gate electrode connected to the j-th compensation scan line SCLj. The third transistor T3 may be turned on in response to the j-th compensation scan signal SCj transferred through the j-th compensation scan line SCLj to connect the gate electrode of the first transistor T1 and the second electrode of the first transistor T1. In this case, the first transistor T1 may be diode-connected. In an embodiment, the third transistor T3 may be defined as a compensation transistor.

The fourth transistor T4 may be electrically connected between the third voltage line VL3, to which the first initialization voltage VINT1 is supplied, and the first node N1. The third voltage line VL3 may be referred to as a first initialization voltage line. The fourth transistor T4 may include a first electrode connected to the third voltage line VL3, a second electrode connected to the first node N1, and a gate electrode connected to the j-th initialization scan line SILj. The fourth transistor T4 may be turned on in response to the j-th initialization scan signal SIj delivered through the j-th initialization scan line SILj to deliver the first initialization voltage VINT1 to the first node N1, and may initialize the potential of the gate electrode of the first transistor T1. In an embodiment, the fourth transistor T4 may be defined as an initialization transistor.

The fifth transistor T5 may be electrically connected between the first voltage line VL1 and the first transistor T1. The fifth transistor T5 may include a first electrode connected to the first voltage line VL1, a second electrode connected to the first electrode of the first transistor T1, and a gate electrode connected to the j-th emission control line EMLj.

The sixth transistor T6 may be electrically connected between the first transistor T1 and the light emitting element ED. The sixth transistor T6 may include a first electrode connected to the second electrode of the first transistor T1, a second electrode connected to the first electrode of the light emitting element ED, and a gate electrode connected to the j-th emission control line EMLj.

The fifth transistor T5 and the sixth transistor T6 may be turned on in response to the emission control signal EMj delivered through the j-th emission control line EMLj. The emission time of the light emitting element ED may be controlled by the emission control signal EMj. When the fifth transistor T5 and the sixth transistor T6 are turned on, a driving current Id according to a voltage difference between the gate voltage of the gate electrode of the first transistor T1 and the first driving voltage ELVDD may be generated and supplied to the light emitting element ED through the sixth transistor T6, and thus the light emitting element ED may emit light. In an embodiment, the fifth transistor T5 and the sixth transistor T6 may be defined as emission control transistors.

The seventh transistor T7 may be electrically connected between the fourth voltage line VL4, to which the second initialization voltage VINT2 is supplied, and the sixth transistor T6. The seventh transistor T7 may include a first electrode connected to the fourth voltage line VL4, a second electrode connected to the second electrode of the sixth transistor T6, and a gate electrode connected to the j-th black scan line SBLj. In an embodiment, the seventh transistor T7 may be defined as an initialization transistor.

The seventh transistor T7 may be turned on in response to the j-th black scan signal SBj delivered through the j-th black scan line SBLj. A part of the driving current Id may be drained through the seventh transistor T7 as a bypass current Ibp. When a black image is displayed, a current (i.e., a light emitting current Ied) that corresponds to a result of subtracting the bypass current Ibp flowing through the seventh transistor T7 from the driving current Id is provided to the light emitting element ED, and thus a black image may be clearly displayed. That is, a contrast ratio of the display device 1000 (see FIG. 1) may be improved by implementing an accurate black luminance image through the seventh transistor T7. In an embodiment, the seventh transistor T7 may be turned on in response to the black scan signal SBj having a low level as a bypass signal, but is not necessarily limited thereto.

One end of the capacitor Cst may be connected to the gate electrode of the first transistor T1, and the other end of the capacitor Cst may be connected to the first voltage line VL1. Charges corresponding to a voltage difference between one end and the other end may be stored in the capacitor Cst. When the fifth transistor T5 and the sixth transistor T6 are turned on, the amount of current flowing to the first transistor T1 may be determined depending on the voltage stored in the capacitor Cst.

In the meantime, a configuration of the pixel driving circuit P_PD according to an embodiment of the present disclosure is not limited to an embodiment illustrated in FIG. 7. The configuration of the pixel driving circuit P_PD illustrated in FIG. 7 is only an example. In an embodiment, for example, the configuration of the pixel driving circuit P_PD may be modified and implemented.

The sensor FX may be connected to a d-th readout line RLd among the readout lines RL1 to RLh, a j-th write scan line SWLj, a reset control line RCL, and a switch control line GTL. Here, 'd' may be a natural number.

The sensor driving circuit O_SD may include four transistors ST1 to ST4. The four transistors ST1 to ST4 may be the reset transistor ST1, the amplification transistor ST2, the output transistor ST3, and the switch transistor ST4, respectively. Each of the reset transistor ST1, the amplification transistor ST2, the output transistor ST3, and the switch transistor ST4 may be a transistor having an LTPS semiconductor layer or a transistor having an oxide semiconductor layer. Furthermore, each of the reset transistor ST1, the amplification transistor ST2, the output transistor ST3, and the switch transistor ST4 may be a P-type transistor or an N-type transistor. In an embodiment, for example, the reset transistor ST1 may be an NMOS transistor having an oxide semiconductor layer, and each of the amplification transistor ST2, the output transistor ST3, and the switch transistor ST4 may be a PMOS transistor having an LTPS semiconductor layer. However, this is only an example. In an embodiment, for example, an embodiment of the transistors ST1 to ST4 included in the sensor driving circuit O_SD is not limited thereto.

The reset control line RCL may receive a reset control signal RST to deliver the reset control signal RST to the sensor FX, and a fifth voltage line VL5 may receive the reset voltage VRST to deliver the reset voltage VRST to the sensor FX.

The sensing element OPD may include a first electrode and a second electrode. The first electrode of the sensing element OPD may be connected to a first sensing node SN1, and the second electrode of the sensing element OPD may be connected to the second voltage line VL2 for receiving the second driving voltage ELVSS. The second electrode of the sensing element OPD may be electrically connected to the second electrode of the light emitting element ED. In an embodiment, for example, the second electrode of the sensing element OPD and the second electrode of the light emitting element ED may be integrated with each other to form a common cathode electrode CE (see FIG. 5). In an embodiment, the first electrode of the sensing element OPD may correspond to a sensing anode electrode, and the second electrode may correspond to a sensing cathode electrode. The sensing element OPD may include an organic photodiode.

Each of the transistors ST1 to ST4 of the sensor driving circuit O_SD may include a first electrode, a second electrode, and a gate electrode. According to an embodiment of the present disclosure, each of the first electrode and the second electrode may be defined as an input electrode or an output electrode (or a source electrode or a drain electrode).

The reset transistor ST1 may include a first electrode connected to a fifth voltage line VL5 for receiving the reset voltage VRST, a second electrode connected to the first sensing node SN1, and a gate electrode connected to the reset control line RCL for receiving the reset control signal RST. The reset transistor ST1 may reset the potential of the first sensing node SN1 to the reset control signal RST in response to the reset control signal RST. The reset control signal RST may be a signal provided through the reset control line RCL. However, an embodiment is not limited thereto. In an embodiment, for example, the reset control signal RST may be the j-th compensation scan signal SCj supplied through the j-th compensation scan line SCLj. That is, according to an embodiment, the reset transistor ST1 may receive the j-th compensation scan signal SCj, which is supplied through the j-th compensation scan line SCLj, as the reset control signal RST.

As an example of the present disclosure, during the at least activation period of the reset control signal RST, the reset voltage VRST may have a voltage level lower than the second driving voltage ELVSS. The reset voltage VRST may be a DC voltage maintained at a voltage level lower than the second driving voltage ELVSS.

The amplification transistor ST2 may include a first electrode receiving a sensing driving voltage SLVD, a second electrode connected with a second sensing node SN2, and a gate electrode connected with the first sensing node SN1. The amplification transistor ST2 is turned on in response to the potential of the first sensing node SN1 to apply the sensing driving voltage SLVD to the second sensing node SN2.

The sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first voltage line VL1. When the sensing driving voltage SLVD corresponds to the first initialization voltage VINT1, the first electrode of the amplification transistor ST2 may be electrically connected with the third voltage line VL3. When the sensing driving voltage SLVD corresponds to the second initialization voltage VINT2, the first electrode of the amplification transistor ST2 may be electrically connected with the fourth voltage line VL4.

The output transistor ST3 may include a first electrode connected to the second sensing node SN2, a second electrode connected to a sub-readout line SRL, and a third electrode receiving an output control signal. The output transistor ST3 may deliver a biometric sensing signal FSd to the sub-readout line SRL in response to the output control signal. The output control signal may be the j-th write scan signal SWj supplied through the j-th write scan line SWLj. That is, the output transistor ST3 may receive the write scan signal SWj supplied from the write scan line SWLj as the output control signal.

During an emission period of the light emitting element ED, the sensing element OPD of the sensor FX may be exposed to light output from the light emitting element ED.

The switch transistor ST4 may include a first electrode connected to the sub-readout line SRL, a second electrode connected to a third sensing node SN3, and a third electrode receiving a switch signal GTj. The third sensing node SN3 may be connected to the readout line RLd. The switch transistor ST4 may transmit the biometric sensing signal FSd to the readout line RLd in response to the switch signal GTj. The switch signal GTj may be supplied through the switch signal line GTL. The switch signal line GTL may be connected to the sensor controller 200C. This will be described later.

The second electrode of the switch transistor ST4 of another adjacent sensor FX may be connected to the third sensing node SN3.

According to an embodiment of the present disclosure, the one readout line RLd may be connected to the plurality of sensors FX. In an embodiment, for example, the one readout line RLd may be electrically connected to two sensors FX, which are adjacent to each other in one row, through the third sensing node SN3. Accordingly, the number of wires of the readout line RLd may be reduced. The number of the readout line RLd disposed in the peripheral area NDA (see FIG. 6) may be reduced. Accordingly, it is possible to provide the display device 1000 (see FIG. 1) in which the area size of the peripheral area NDA (see FIG. 6) is effectively reduced.

Also, according to an embodiment of the present disclosure, the fingerprint controller ROC (see FIG. 6) may be electrically connected to the readout lines RLd. The sensor layer 200 may generate a sensing signal by sensing the external input 2000 (see FIG. 3). The sensor controller 200C may generate the switch signal GTj based on the sensing signal. The switch transistor ST4 may provide the biometric sensing signal FSd to the readout line RLd based on the switch signal GTj, and the biometric sensing signal FSd may be provided to the fingerprint controller ROC (see FIG. 6). That is, only the sensor FX to be operated may be driven by using the switch transistor ST4. Accordingly, the fingerprint controller ROC (see FIG. 6) may receive the biometric sensing signal FSd from readout lines, which are electrically connected to a sensor to be operated, from among a plurality of readout lines. As the number of readout lines RLd sensed by the fingerprint controller ROC decreases, the time required for sensing the biometric sensing signal FSd may be shortened. The time required to obtain biometric information may be reduced. Accordingly, the display device 1000 (see FIG. 1) having improved reliability may be provided.

In the meantime, a configuration of the sensor driving circuit O_SD according to an embodiment of the present disclosure is not limited to an embodiment illustrated in FIG. 6. The configuration of the sensor driving circuit O_SD illustrated in FIG. 6 is only an example, and the configuration of the sensor driving circuit O_SD may be modified and implemented.

Figure 8:
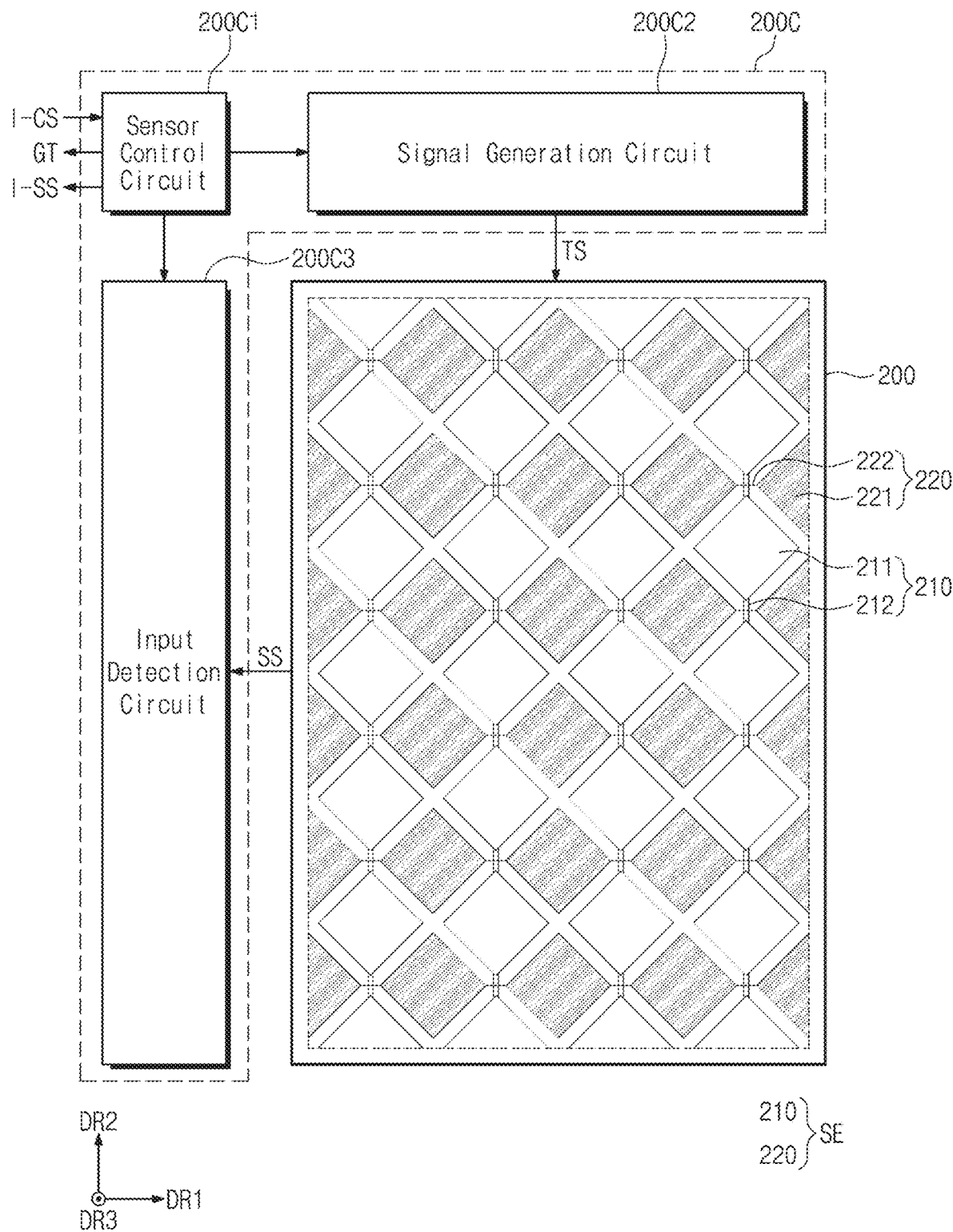
FIG. 8 is a block diagram illustrating a sensor layer and a sensor controller, according to an embodiment of the present disclosure.

FIG. 8 is a block diagram illustrating a sensor layer and a sensor controller, according to an embodiment of the present disclosure.

Referring to FIG. 8, the sensor layer 200 may include a plurality of sensing electrodes SE. The plurality of sensing electrodes SE may include a plurality of first sensing electrodes 210 and a plurality of second sensing electrodes 220. The plurality of second sensing electrodes 220 may be intersected with the plurality of first sensing electrodes 210. Although not shown in drawings, the sensor layer 200 may further include a plurality of signal wires connected to the plurality of first sensing electrodes 210 and the plurality of second sensing electrodes 220.

The plurality of first sensing electrodes 210 may be arranged in the first direction DR1. Each of the plurality of first sensing electrodes 210 may extend in the second direction DR2. Each of the plurality of first sensing electrodes 210 may include a sensing pattern 211 and a bridge pattern 212. The two sensing patterns 211 adjacent to each other may be electrically connected to each other by the two bridge patterns 212, but are not particularly limited thereto. The sensing pattern 211 may be included in the second conductive layer 204 (see FIG. 5), and the bridge pattern 212 may be included in the first conductive layer 202 (see FIG. 5).

The plurality of second sensing electrodes 220 may be arranged in the second direction DR2. Each of the plurality of second sensing electrodes 220 may extend in the first direction DR1. Each of the plurality of second sensing electrodes 220 may include a first portion 221 and a second portion 222. The two bridge patterns 212 may be intersected with the second portion 222 in an insulation scheme. The first portion 221 and the second portion 222 may have integral shapes with each other and may be disposed on the same layer. In an embodiment, for example, the first portion 221 and the second portion 222 may be included in the second conductive layer 204 (see FIG. 5).

The sensor controller 200C may receive the control signal I-CS and may provide a coordinate signal I-SS and a switch signal GT.

The sensor controller 200C may be implemented as an integrated circuit ("IC"). The sensor controller 200C may be mounted on the separate circuit board PB (see FIG. 2) in a chip on film ("COF") method and may be electrically connected to the sensor layer 200 or may be directly mounted in a predetermined area of the sensor layer 200.

The sensor controller 200C may include a sensor control circuit 200C1, a signal generation circuit 200C2, and an input detection circuit 200C3.

The signal generation circuit 200C2 may output transfer signals TS to the sensor layer 200, In an embodiment, for example, the plurality of first sensing electrodes 210. However, this is an example. In an embodiment, for example, the signal generation circuit 200C2 according to an embodiment of the present disclosure may transmit the transfer signal TS to the plurality of second sensing electrodes 220. The signal generation circuit 200C2 may sequentially output the transfer signals TS to the first sensing electrodes 210.

The input detection circuit 200C3 may receive the sensing signals SS from the sensor layer 200. In an embodiment, for example, the input detection circuit 200C3 may receive a sensing signal SS from the plurality of second sensing electrodes 220. However, this is an example. In an embodiment, for example, the input detection circuit 200C3 according to an embodiment of the present disclosure may receive the sensing signal SS from the plurality of first sensing electrodes 210.

The sensor control circuit 200C1 may convert an analog signal received from the input detection circuit 200C3 into a digital signal. In an embodiment, for example, the sensor control circuit 200C1 may reduce or remove noise of the received sensing signals SS having an analog format, may amplify and filter the signal, in which the noise is reduce or removed, and may convert the filtered signal into a digital signal.

The sensor control circuit 200C1 may generate a switch signal GT based on the sensing signal SS. The sensor control circuit 200C1 may output a switch signal GT to the switch signal line GTL of the switch transistor ST4 (see FIG. 7) of the sensor FX (see FIG. 7).

Figure 9:
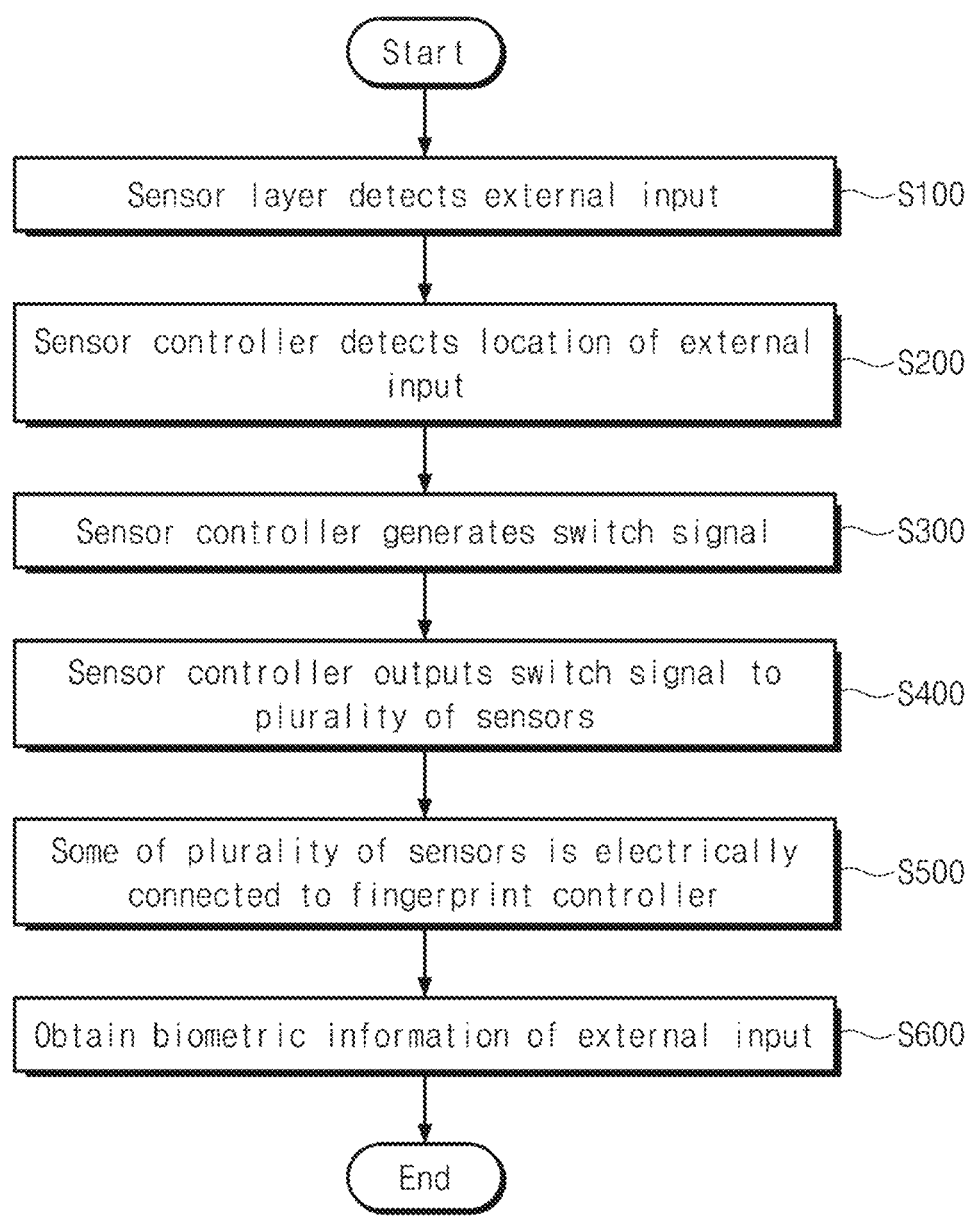
FIG. 9 is a flowchart illustrating a method of driving a display device, according to an embodiment of the present disclosure.

FIG. 9 is a flowchart illustrating a method of driving a display device, according to an embodiment of the present disclosure.

Referring to FIGS. 3, 6, and 9, the sensor layer 200 may detect the external input 2000 (S100).

The sensor controller 200C may detect a location of the external input 2000 (S200).

The sensor controller 200C may generate the switch signal GT (S300).

The sensor controller 200C may output the switch signal GT to the plurality of sensors FX (S400).

Some of the plurality of sensors FX may be electrically connected to the fingerprint controller ROC (S500).

The fingerprint controller ROC may obtain biometric information of the external input 2000 (S600).

Figure 10:
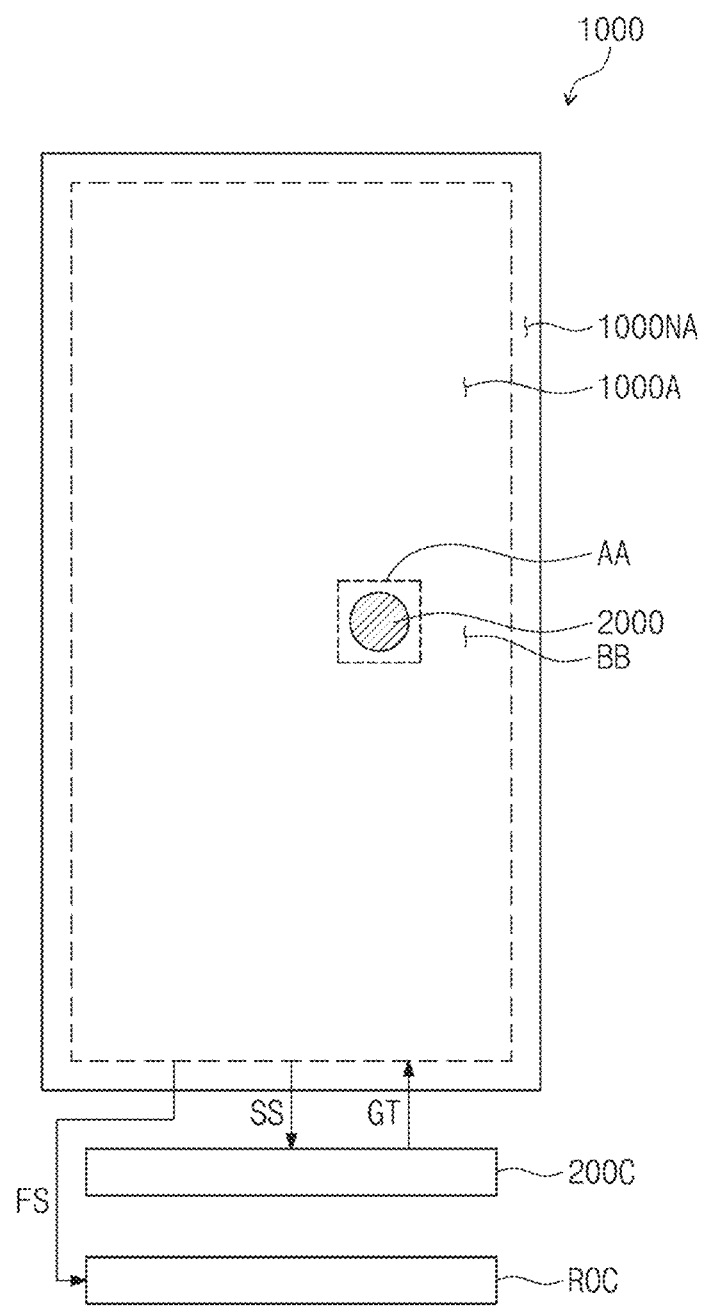
FIG. 10 is a block diagram illustrating a display device provided with an external input, according to an embodiment of the present disclosure.
Figure 11:
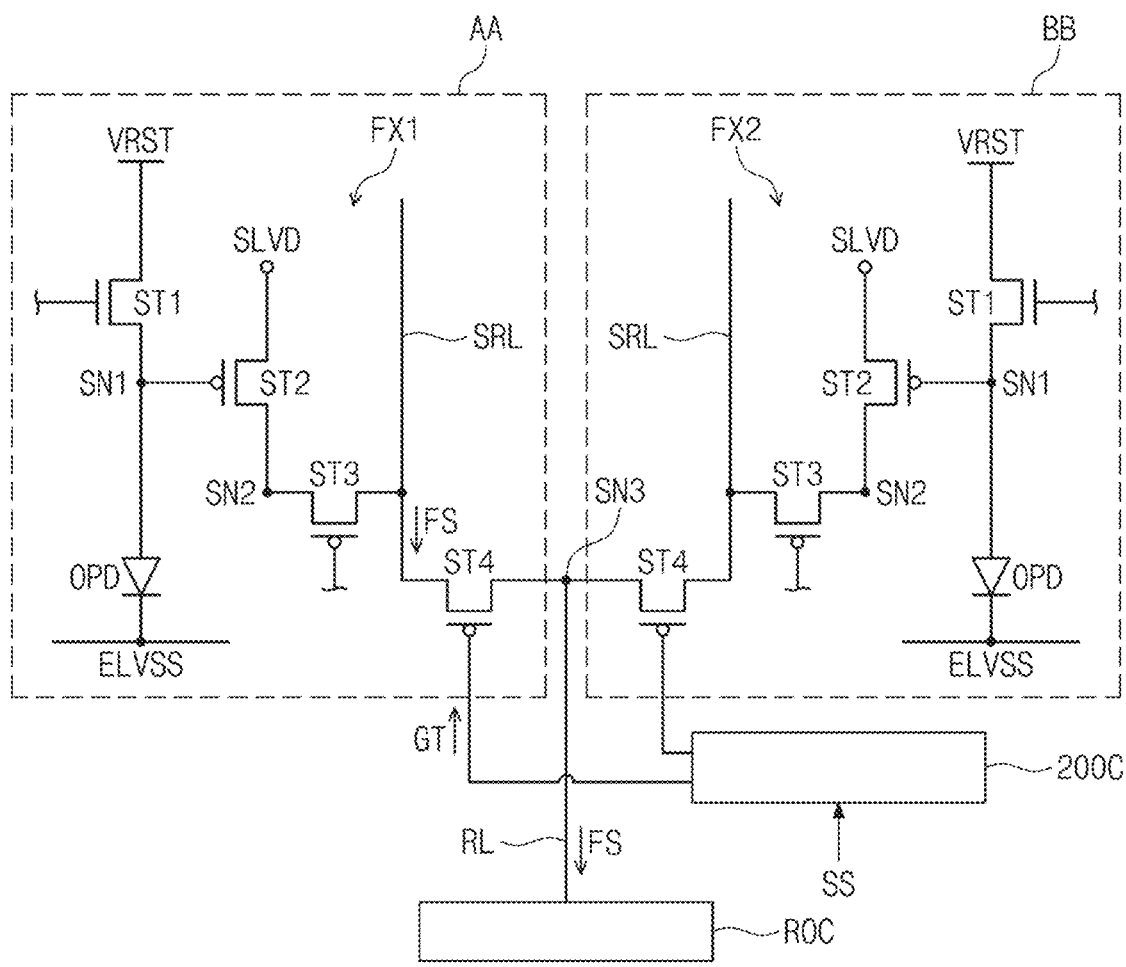
FIG. 11 is a block diagram illustrating a plurality of sensors, a sensor controller, and a fingerprint controller, according to an embodiment of the present disclosure.

FIG. 10 is a block diagram illustrating a display device provided with an external input, according to an embodiment of the present disclosure. FIG. 11 is a block diagram illustrating a plurality of sensors, a sensor controller, and a fingerprint controller, according to an embodiment of the present disclosure. In the description of FIG. 11, the same reference numerals are assigned to the same components described with reference to FIG. 7, and thus the descriptions thereof are omitted to avoid redundancy.

FIG. 11 illustrates a first sensor FX1 disposed in a first area AA and a second sensor FX2 disposed in a second area BB among the plurality of sensors FX (see FIG. 6).

Referring to FIGS. 8 to 11, the external input 2000 may be provided to the active area 1000A of the display device 1000. In the active area 1000A, an area overlapping the external input 2000 in a plan view may be defined as the first area AA, and an area that does not overlap the external input 2000 in a plan view may be defined as the second area BB. That is, the first area AA may be an area where the external input 2000 is detected, and the second area BB may be an area where the external input 2000 is not detected.

The sensor layer 200 may detect the external input 2000 (S100). The transfer signal TS may be transmitted to the plurality of first sensing electrodes 210. The capacitance between the transfer signal TS and the external input 2000 may be changed. A sensing signal SS may be generated based on a change in the capacitance. The sensing signal SS may be received from the plurality of second sensing electrodes 220.

The sensor layer 200 may provide the sensing signal SS to the sensor controller 200C.

The sensor controller 200C may calculate coordinate information of an input based on the sensing signal SS received from the sensor layer 200 and then may calculate the location of the external input 2000 based on the coordinate information. That is, the sensor controller 200C may detect the location of the external input 2000 based on the sensing signal SS (S200).

Each of the sensors, which are disposed in the first area AA, from among the plurality of sensors FX (see FIG. 6) may be referred to as the "first sensor FX1". Each of the sensors, which are disposed in the second area BB, from among the plurality of sensors FX (see FIG. 6) may be referred to as the "second sensor FX2".

The readout line RL may be electrically connected to the sub-readout line SRL of each of at least two or more sensors FX1 and FX2 among the plurality of sensors FX (see FIG. 6).

According to an embodiment of the present disclosure, the number of readout lines RL disposed in the peripheral area NDA (see FIG. 6) of the display layer 100 (see FIG. 6) may be reduced by the switch transistor ST4. That is, a circuit such as the multiplexer MP may be unnecessary to reduce the number of wires provided to the fingerprint controller ROC by the display device 1000 (see FIG. 1).

Moreover, as the circuit is deleted, the resistance of the readout line RL may be reduced. In the biometric sensing signal FS transmitted through the readout line RL, noise generated by the resistance may be effectively reduced or eliminated. Accordingly, the display device 1000 with improved reliability may be provided.

The sensor controller 200C may generate the switch signal GT based on the sensing signal SS (S300). The sensor controller 200C may determine the location of the external input 2000 and may generate the switch signal GT based on the location. In an embodiment, for example, the location may be calculated by coordinate information or the like.

In response to the switch signal GT, the plurality of sensors FX (see FIG. 6) disposed in an area overlapping the external input 2000 in a plan view may be driven, and the plurality of sensors FX (see FIG. 6) disposed in an area that does not overlap the external input 2000 in a plan view may not be driven.

Moreover, in response to the switch signal GT, the plurality of sensors FX (see FIG. 6) may be driven in a time division method. In an embodiment, for example, the fingerprint controller ROC may receive a biometric sensing signal of one sensor depending on the on/off operation of the switch transistor ST4 and then may receive a biometric sensing signal of another adjacent sensor connected by the third sensing node SN3.

According to an embodiment of the present disclosure, the number of readout lines RL disposed in the peripheral area NDA (see FIG. 6) of the display layer 100 (see FIG. 6) may be reduced due to the time-division driving. Accordingly, it is possible to provide the display device 1000 (see FIG. 1) in which the area size of the peripheral area NDA (see FIG. 6) is effectively reduced.

Furthermore, according to an embodiment of the present disclosure, the density of the number of readout lines RL in the peripheral area NDA (see FIG. 6) may be reduced, thereby reducing or eliminating short circuits in the readout lines RL adjacent to each other in a process of manufacturing the display device 1000. Accordingly, the display device 1000 with improved reliability may be provided.

The sensor controller 200C may output the switch signal GT to the plurality of sensors FX1 and FX2 (S400).

In response to the switch signal GT, the switch transistor ST4 of the first sensor FX1 may be turned on, and the switch transistor ST4 of the second sensor FX2 may be turned off.

In an embodiment, for example, the plurality of first sensors FX1 may be provided. When viewed from above a plane, the switch transistor ST4 included in each of the plurality of first sensors FX1, which overlap the external input 2000, from among the plurality of sensors FX (see FIG. 6) may be turned on in response to the switch signal GT. In an embodiment, for example, the plurality of second sensors FX2 may be provided. When viewed from above a plane, the switch transistor ST4 included in each of the plurality of second sensors FX2, which does not overlap the external input 2000, from among the plurality of sensors FX (see FIG. 6) may be turned on in response to the switch signal GT.

The first sensor FX1 may be electrically connected to the fingerprint controller ROC (S500). The biometric sensing signal FS generated by the first sensor FX1 may be output to the fingerprint controller ROC. On the basis of the biometric sensing signal FS obtained by the first sensor FX1, the fingerprint controller ROC may obtain biometric information of the external input 2000 provided to the first area AA (S600).

According to an embodiment of the present disclosure, the fingerprint controller ROC may receive the biometric sensing signal FS from only the sensors overlapping the external input 2000 on a plane among the plurality of sensors FX (see FIG. 6). As the number of readout lines RL sensed by the fingerprint controller ROC decreases, the time required for sensing the biometric sensing signal FS may be shortened. The time required to obtain biometric information may be effectively reduced. Accordingly, the display device 1000 with improved reliability may be provided.

Figure 12:
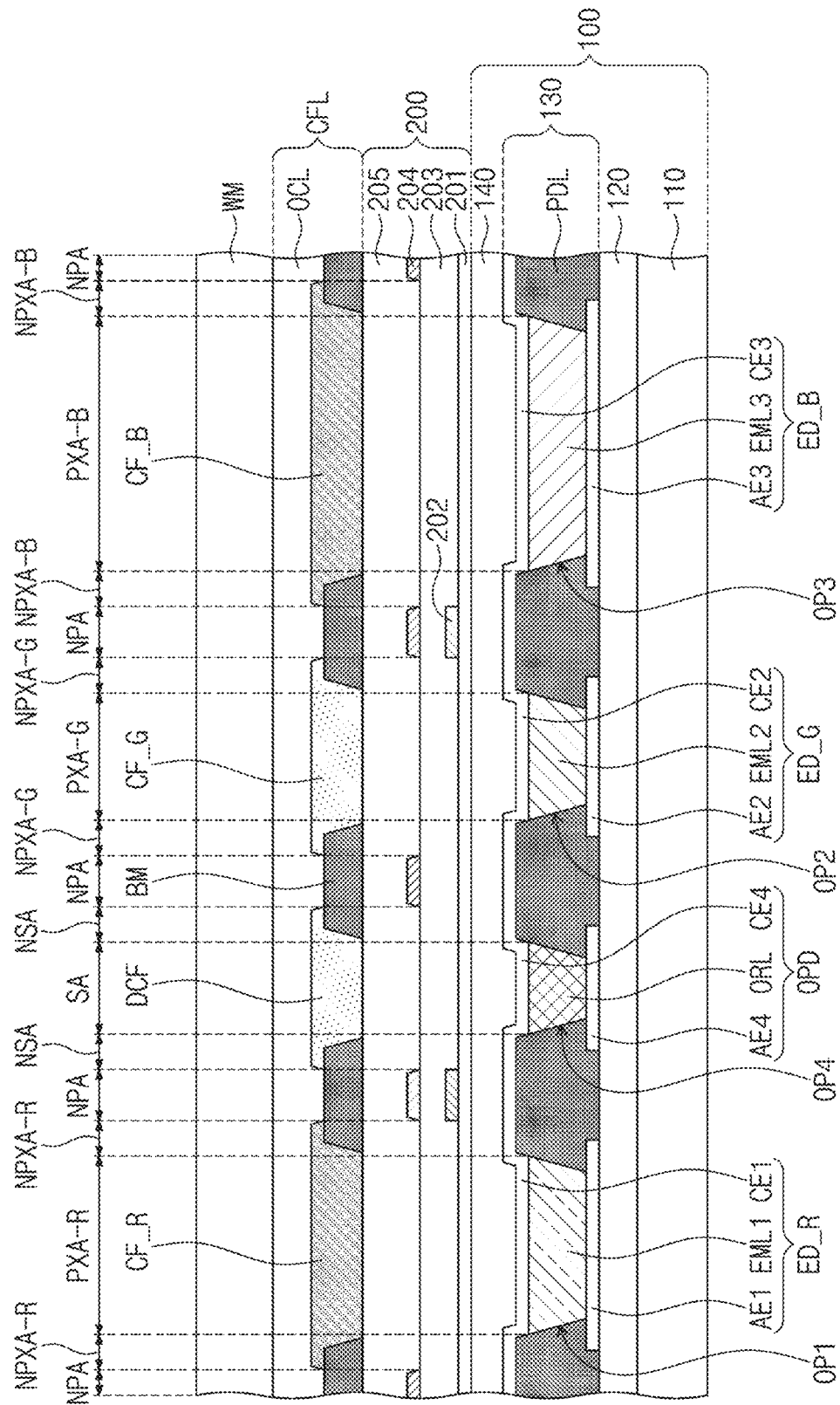
FIG. 12 is a cross-sectional view illustrating a light emitting element and a sensing element of a display layer, according to an embodiment of the present disclosure.

FIG. 12 is a cross-sectional view illustrating a light emitting element and a sensing element of a display layer, according to an embodiment of the present disclosure. In the description of FIG. 12, the same reference numerals are assigned to the same components described with reference to FIGS. 2 and 5, and thus the descriptions thereof are omitted to avoid redundancy.

Referring to FIG. 12, a first electrode layer may be disposed on the circuit layer 120. A pixel defining layer PDL may be disposed on the first electrode layer and the circuit layer 120. The first electrode layer may include first to third anodes AE1, AE2, and AE3. First to third openings OP1, OP2, and OP3 of the pixel defining layer PDL may expose at least part of the first to third anodes AE1, AE2, and AE3, respectively. In an embodiment of the present disclosure, the pixel defining layer PDL may further include a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

The display layer 100 may include first to third emission areas PXA-R, PXA-G, and PXA-B and first to third non-emission areas NPXA-R, NPXA-G, and NPXA-B adjacent to the first to third emission areas PXA-R, PXA-G, and PXA-B, respectively. The non-emission areas NPXA-R, NPXA-G, and NPXA-B may surround the corresponding emission areas PXA-R, PXA-G, and PXA-B, respectively. In an embodiment, the first emission area PXA-R may be defined to correspond to a partial area of the first anode AE1 exposed by the first opening OP1. The second emission area PXA-G may be defined to correspond to a partial area of the second anode AE2 exposed by the second opening OP2. The third emission area PXA-B may be defined to correspond to a partial area of the third anode AE3 exposed by the third opening OP3. Non-pixel areas NPA may be defined between the first to third non-emission areas NPXA-G, NPXA-B, and NPXA-R.

A light emitting layer may be disposed on the first electrode layer. The light emitting layer may include first to third light emitting layers EML1 to EML3. The first to third light emitting layers EML1 to EML3 may be disposed in areas corresponding to the first to third openings OP1, OP2, and OP3, respectively. Each of the first to third light emitting layers EML1 to EML3 may include an organic material and/or an inorganic material. The first to third light emitting layers EML1 to EML3 may generate light of a predetermined color. In an embodiment, for example, the first light emitting layer EML1 may generate red light; the second light emitting layer EML2 may generate green light; and, the third light emitting layer EML3 may generate blue light.

In an embodiment, the patterned first to third light emitting layers EML1 to EML3 are illustrated. However, one light emitting layer may be disposed in the first to third emission areas PXA-R, PXA-G, and PXA-B in common. At this time, the light emitting layer may generate white light or blue light. Also, the light emitting layer may have a multi-layer structure that is referred to as "tandem".

Alternatively, each of the first to third light emitting layers EML1 to EML3 may include a low molecular weight organic material or a high molecular weight organic material as a light emitting material. Alternatively, each of the first to third light emitting layers EML1 to EML3 may include a quantum dot material as a light emitting material. The core of a quantum dot may be selected from a group II-VI compound, a group III-V compound, a group IV-VI compound, a group IV element, a group IV compound, and a combination thereof.

A second electrode layer may be disposed on the light emitting layer. The second electrode layer may include first to third cathodes CE1, CE2, and CE3. The first to third cathodes CE1, CE2, and CE3 may be electrically connected to one another. As an example of the present disclosure, the first to third cathodes CE1, CE2, and CE3 may be integrated with each other. In this case, the first to third cathodes CE1, CE2, and CE3 may be disposed in the first to third emission areas PXA-R, PXA-G, and PXA-B, the first to third non-emission areas NPXA-R, NPXA-G, and NPXA-B, and the non-pixel area NPA in common.

The light emitting element layer 130 may further include sensing elements OPD. Each of the sensing elements OPD may include an organic photodiode. A fourth opening OP4 provided to correspond to the sensing elements OPD may be further defined in the pixel defining layer PDL.

Each of the sensing elements OPD may include a fourth anode AE4, a photoelectric conversion layer ORL, and a fourth cathode CE4. The fourth anode AE4 may be disposed on the same layer as the first electrode layer. That is, the fourth anode AE4 is disposed on the light emitting element layer 130 and may be formed simultaneously through the same process as the first to third anodes AE1, AE2, and AE3.

The fourth opening OP4 of the pixel defining layer PDL may expose at least part of the fourth anode AE4. The photoelectric conversion layer ORL may be disposed on the fourth anode AE4 exposed by the fourth opening OP4. The photoelectric conversion layer ORL may include an organic photo-sensing material. The fourth cathode CE4 may be disposed on the photoelectric conversion layer ORL. The fourth cathode CE4 may be simultaneously formed through the same process as the first to third cathodes CE1 to CE3. As an example of the present disclosure, the fourth cathode CE4 may be integrated with the first to third cathodes CE1 to CE3.

Each of the fourth anode AE4 and the fourth cathode CE4 may receive an electrical signal. The fourth cathode CE4 may receive a signal different from a signal of the fourth anode AE4. Accordingly, a predetermined electric field may be formed between the fourth anode AE4 and the fourth cathode CE4. The photoelectric conversion layer ORL may generate an electrical signal corresponding to the light incident on a sensor. The photoelectric conversion layer ORL may generate an electric charge by absorbing the energy of the incident light. In an embodiment, for example, the photoelectric conversion layer ORL may include a light-sensitive semiconductor material.

The charges generated by the photoelectric conversion layer ORL change an electric field between the fourth anode AE4 and the fourth cathode CE4. The amount of charge generated by the photoelectric conversion layer ORL may vary depending on whether light is incident on the sensing elements OPD, or the amount and intensity of light incident on the sensing elements OPD. Accordingly, the electric field formed between the fourth anode AE4 and the fourth cathode CE4 may vary. The sensing elements OPD according to an embodiment of the present disclosure may obtain fingerprint information of a user through a change in the electric field between the fourth anode AE4 and the fourth cathode CE4.

However, this is illustrated by way of example. Each of the sensing elements OPD may include a phototransistor that uses the photoelectric conversion layer ORL as an active layer. In this case, each of the sensing elements OPD may obtain fingerprint information by sensing the amount of current flowing through the phototransistor. Each of the sensing elements OPD according to an embodiment of the present disclosure may include various photoelectric conversion elements capable of generating an electrical signal in response to a change in the amount of light, but is not limited to an embodiment.

According to an embodiment of the present disclosure, as a configuration for obtaining biometric information is included in the display layer 100, the display device 1000 (see FIG. 1) may not require a separate electronic module for obtaining the biometric information. In an embodiment, for example, the electronic module may include an ultrasonic fingerprint sensor. Accordingly, the display device 1000 (see FIG. 1) may not require a separate space for accommodating the electronic module. A process of manufacturing the display device 1000 (see FIG. 1) may be simplified.

The display device 1000 (see FIG. 1) may include the sensor layer 200 disposed on the display layer 100 and a color filter layer CFL disposed on the sensor layer 200.

The color filter layer CFL may be directly disposed on the cover insulating layer 205. The color filter layer CFL may include a first color filter CF_R, a second color filter CF_G, and a third color filter CF_B. The first color filter CF_R has a first color; the second color filter CF_G has a second color; and, the third color filter CF_B has a third color. As an example of the present disclosure, the first color may be red; the second color may be green; and, the third color may be blue.

The color filter layer CFL may further include a dummy color filter DCF. As an example of the present disclosure, when an area where the photoelectric conversion layer ORL is disposed is defined as a sensing area SA, and a periphery of the sensing area SA is defined as a non-sensing area NSA, the dummy color filter DCF may be disposed to correspond to the sensing area SA. The dummy color filter DCF may overlap the sensing area SA and the non-sensing area NSA in a plan view. As an example of the present disclosure, the dummy color filter DCF may have the same color as one of the first to third color filters CF_R, CF_G, and CF_B. As an example of the present disclosure, the dummy color filter DCF may have the same green color as the second color filter CF_G.

The color filter layer CFL may further include a black matrix BM. The black matrix BM may be disposed to correspond to the non-pixel area NPA. The black matrix BM may be disposed to overlap the first and second conductive layers 202 and 204 in the non-pixel area NPA in a plan view. As an example of the present disclosure, the black matrix BM may overlap the non-pixel area NPA and the first to third non-emission areas NPXA-R, NPXA-G, and NPXA-B. The black matrix BM may not overlap the first to third emission areas PXA-R, PXR-G, and PXA-B in a plan view.

The color filter layer CFL may further include an overcoat layer OCL. The overcoat layer OCL may include an organic insulating material. The overcoat layer OCL may be provided with a thickness sufficient to remove a step between the first to third color filters CF_R, CF_G, and CF_B. A material of the overcoat layer OCL may not be particularly limited as long as the material is capable of planarizing an upper surface of the color filter layer CFL with a given thickness and may include, In an embodiment, for example, an acrylate-based organic material.

The window WM may be disposed on the overcoat layer OCL.

Figure 13:
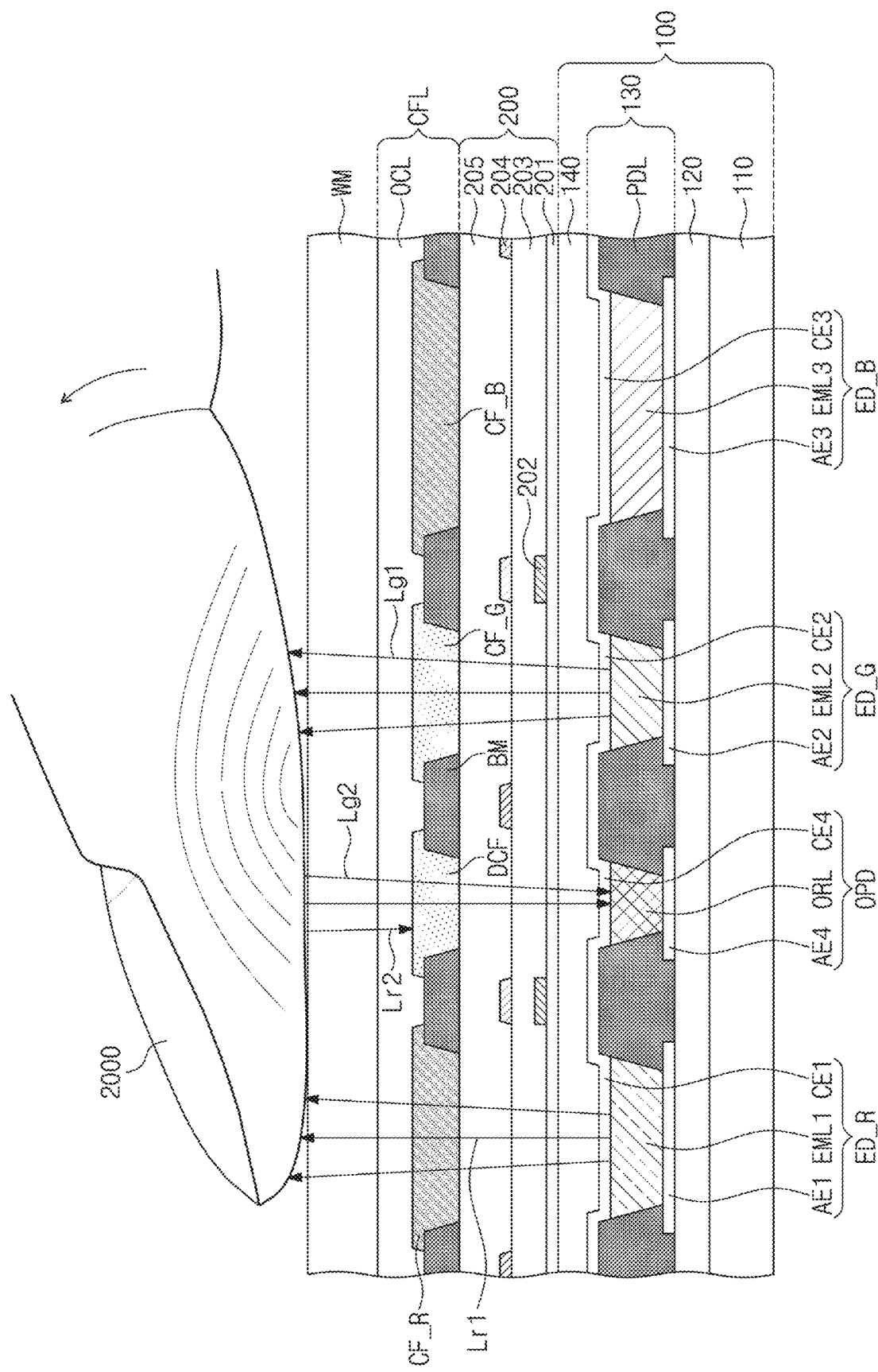
FIG. 13 illustrates a display device provided with an external input, according to an embodiment of the present disclosure.

FIG. 13 illustrates a display device provided with an external input, according to an embodiment of the present disclosure. In the description of FIG. 13, the same reference numerals are assigned to the same components described with reference to FIG. 12, and thus the descriptions thereof are omitted to avoid redundancy.

Referring to FIGS. 6, 10, and 13, the driving controller 100C may control the plurality of pixels PX disposed in the first area AA overlapping the external input 2000 to emit light.

Each of the first to third light emitting elements ED_R, ED_G, and ED_B disposed on the first area AA may emit light. The first light emitting elements ED_R emit first light; the second light emitting elements ED_G emit second light; and, the third light emitting elements ED_B output third light. Herein, the first light Lr1 may be light in a red wavelength band; the second light Lg1 may be light in a green wavelength band; and, the third light may be light in a blue wavelength band.

Each of the sensing elements OPD may receive light from specific light emitting elements (e.g., the second light emitting elements ED_G) among the first to third light emitting elements ED_R, ED_G, and ED_B. That is, each of the sensing elements OPD may receive second reflected light Lg2, which is reflected by a user's fingerprint from the second light Lg1 output from the second light emitting elements ED_G. The second light Lg1 and the second reflected light Lg2 may be light in a green wavelength band. The dummy color filter DCF is disposed on the sensing elements OPD. The dummy color filter DCF may have a green color. Accordingly, the second reflected light Lg2 may pass through the dummy color filter DCF and may be incident on the sensing elements OPD.

In the meantime, second light and third light, which are respectively output from the second and third light emitting elements ED_R and ED_B, may also be reflected by the external input 2000. In an embodiment, for example, when light from reflecting the first light Lr1, which is output from the first light emitting elements ED_R, from the external input 2000 is defined as first reflected light Lr2, the first reflected light Lr2 may be absorbed without passing through the dummy color filter DCF. Accordingly, the first reflected light Lr2 may not pass through the dummy color filter DCF, and thus may not be incident on the sensing elements OPD. Likewise, even though the third light is reflected by the external input 2000, the third light may be absorbed by the dummy color filter DCF. Accordingly, only the second reflected light Lg2 may be provided to the sensing elements OPD. The external input 2000 may include a user's hand, and biometric information detected by the external input 2000 may include a fingerprint of the user's hand.

According to an embodiment of the present disclosure, in response to switch operations of the switch signal GT and the switch transistor ST4 (see FIG. 1), the fingerprint controller ROC may receive the biometric sensing signal FS from only the sensors overlapping the external input 2000 on a plane among the plurality of sensors FX (see FIG. 1). That is, the fingerprint controller ROC may receive the biometric sensing signal FS from only the plurality of sensors FX disposed in the first area AA. In this case, the driving controller 100C may control only the plurality of pixels PX disposed in the first area AA to emit light. That is, because the pixels PX overlapping the second area BB do not emit light in a plan view, power consumption may be effectively reduced compared to a case where the entire active area DA emits light.

Figure 14A:
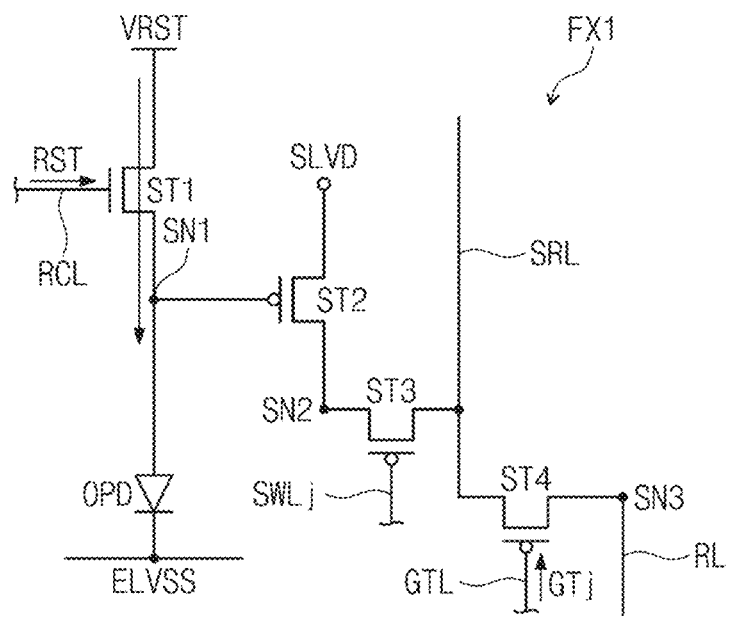
FIGS. 14A to 14C are circuit diagrams illustrating an operation of a first sensor, according to an embodiment of the present disclosure.
Figure 14B:
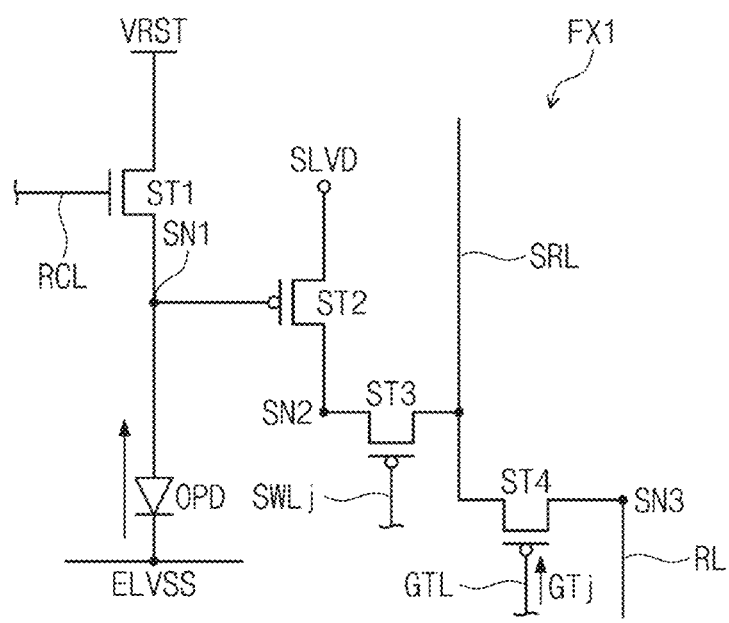
Figure 14C:
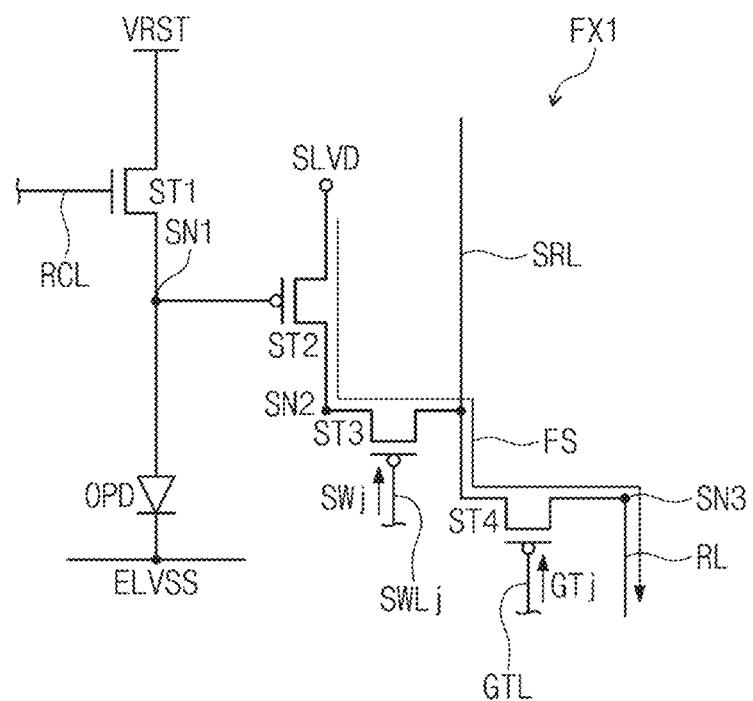

FIGS. 14A to 14C are circuit diagrams illustrating an operation of a first sensor, according to an embodiment of the present disclosure. In the description of FIGS. 14A to 14C, the same reference numerals are assigned to the same components described with reference to FIG. 11, and thus the descriptions thereof are omitted to avoid redundancy.

Referring to FIGS. 9 and 14A to 14C, a step S600 of obtaining biometric information of the external input 2000 (see FIG. 10) may include a sensor initialization step in which the reset transistor ST1 is turned on, a sensor active step in which the sensing element OPD receives the reflected light Lg2 (see FIG. 13) reflected from the external input 2000 (see FIG. 10), and a sensor sensing step in which the amplification transistor ST2 and the output transistor ST3 are turned on, and the biometric sensing signal FS is provided to the readout line RL.

Referring to FIG. 14A, when the reset control signal RST of a high level is supplied through the reset control line RCL in the sensor initialization step, the reset transistor ST1 may be turned on. The sensor initialization step may be defined as an activation period (i.e., a high-level period) of the reset control line RCL. However, an embodiment is not limited thereto. In another embodiment, for example, when the reset transistor ST1 is a PMOS transistor, the reset control signal RST of a low level may be supplied to the reset control line RCL during the reset period. During the reset period, a potential of the first sensing node SN1 may be reset to a potential corresponding to the reset voltage VRST.

Referring to FIGS. 7 and 14B, in the sensor active step, the sensing element OPD of the sensor FX may be exposed to light output from the light emitting element ED during an emission period of the light emitting element ED. When the user's body (see external input 2000 in FIG. 10) touches a display surface of the display device 1000 (see FIG. 1), the sensing element OPD may generate photo-charges corresponding to light reflected by a ridge of a fingerprint or a valley between ridges of the fingerprint. The amount of current flowing through the sensing element OPD may be changed by the generated photo-charges.

Referring to FIGS. 7 and 14C, in the sensor sensing step, the amplification transistor ST2 may be a source follower amplifier that generates a source-drain current in proportion to a potential of the first sensing node SN1 input to the gate electrode of the amplification transistor ST2. When the j-th write scan signal SWj having a low level is supplied to the output transistor ST3, the output transistor ST3 may be turned on, and the biometric sensing signal FS corresponding to a current flowing through the amplification transistor ST2 may be output to the sub-readout line SRL.

In this case, in the sensor controller 200C, the switch signal GT may be output to sensors, which overlap the external input 2000 on a plane, from among the plurality of sensors FX (see FIG. 6) such that the switch transistor ST4 is turned on.

The biometric sensing signal FS may be provided to the fingerprint controller ROC through the readout line RL. The fingerprint controller ROC may process the biometric sensing signal FS. The processed biometric sensing signals S_FS (see FIG. 6) may be provided to the driving controller 100C (see FIG. 6). The driving controller 100C (see FIG. 6) may recognize biometric information based on the biometric sensing signals S_FS (see FIG. 6).

Figure 15:
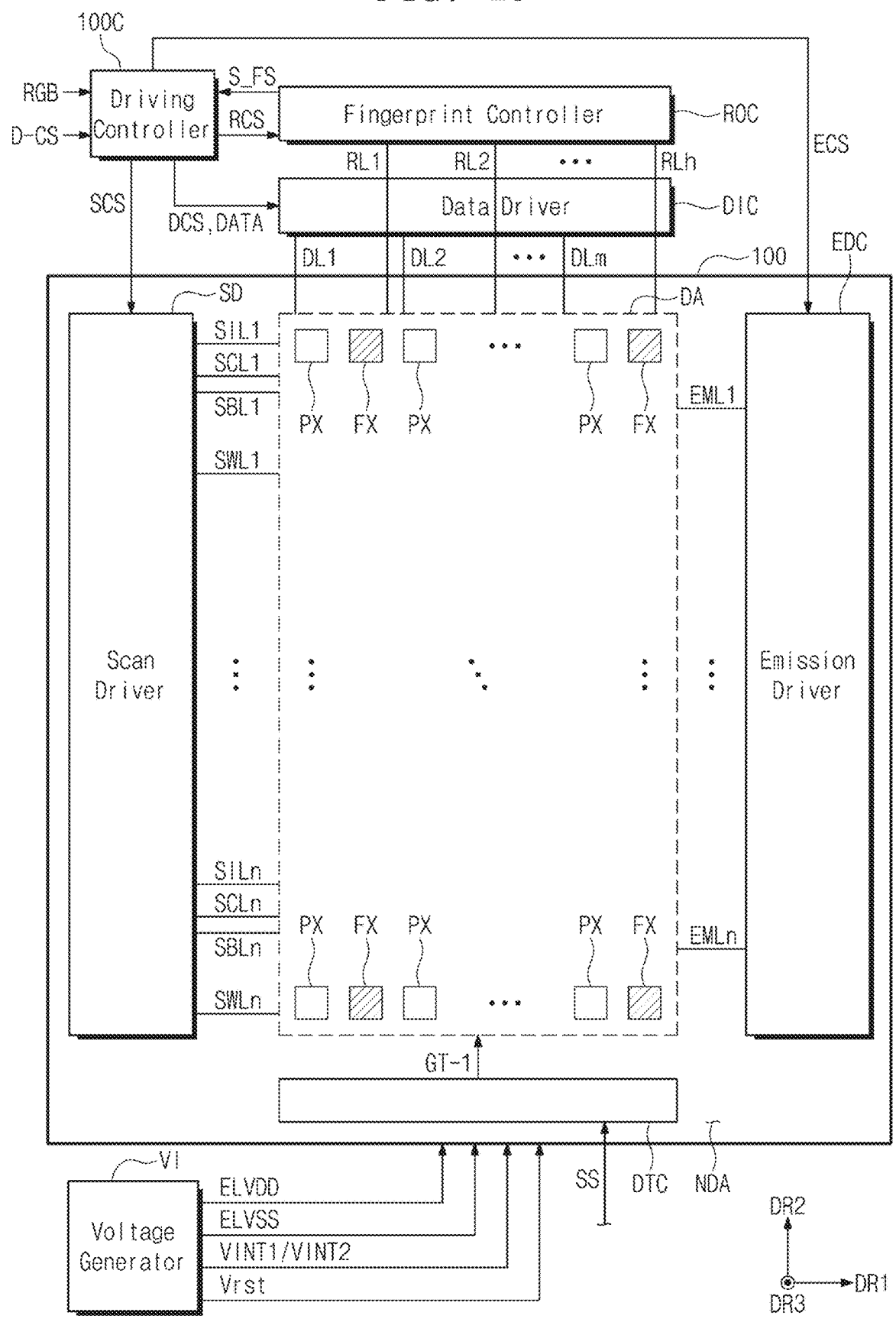
FIG. 15 is a block diagram of a display device, according to an embodiment of the present disclosure.
Figure 16:
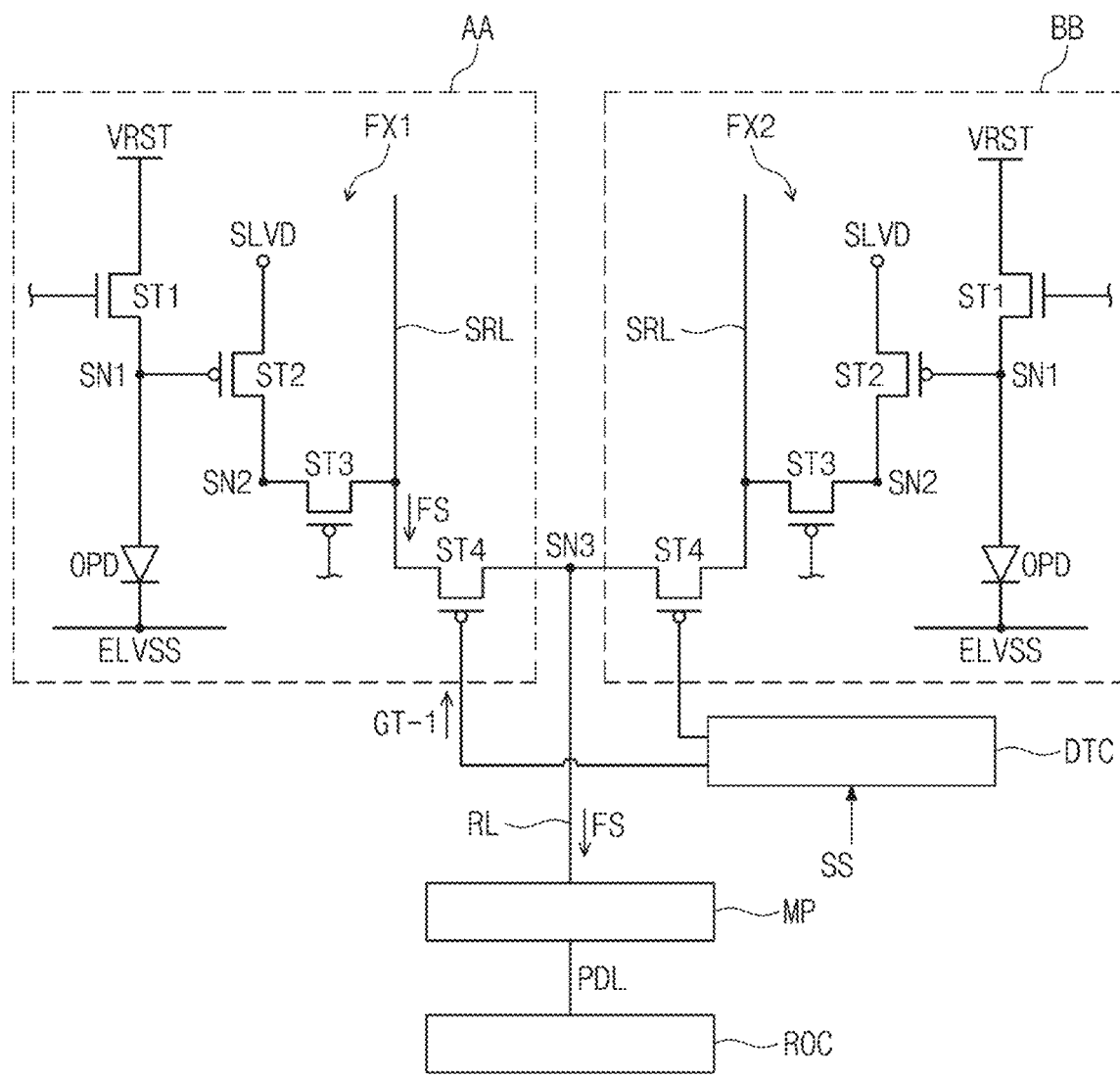
FIG. 16 is a block diagram illustrating a plurality of sensors, a sensing circuit, a multiplexer, and a fingerprint controller, according to an embodiment of the present disclosure.

FIG. 15 is a block diagram of a display device, according to an embodiment of the present disclosure. FIG. 16 is a block diagram illustrating a plurality of sensors, a sensing circuit, a multiplexer, and a fingerprint controller, according to an embodiment of the present disclosure. In the description of FIG. 15, the same reference numerals are assigned to the same components described with reference to FIG. 6, and thus the descriptions thereof are omitted to avoid redundancy. In the description of FIG. 16, the same reference numerals are assigned to the same components described with reference to FIG. 11, and thus the descriptions thereof are omitted to avoid redundancy.

Referring to FIGS. 2, 15, and 16, the display layer 100 may further include a sensing circuit DTC disposed in the peripheral area NDA.

The sensing circuit DTC may directly receive the sensing signal SS from the sensor layer 200 (see FIG. 8). That is, the sensing circuit DTC may receive the sensing signal SS without passing through the sensor controller 200C.

The sensing circuit DTC may generate a switch signal GT-1 based on the sensing signal SS. In an embodiment, for example, the sensing circuit DTC may sense a location at which the external input 2000 (see FIG. 3) is provided, based on a current value of the sensing signal SS and may determine the switch transistor ST4 of the sensor FX to be driven based on the location of the external input 2000 (see FIG. 3). In this way, the sensing circuit DTC may generate the switch signal GT-1 for driving the switch transistor ST4.

The sensing circuit DTC may be disposed in an area adjacent to the data driver DIC.

According to an embodiment of the present disclosure, as compared to a case where a switch signal is generated by the sensor controller 200C placed on the circuit board PB and delivered to the switch transistor ST4, a distance at which signals are delivered may be relatively reduced, thereby reducing a time required to sense the biometric sensing signal FS. The time required to obtain biometric information may be reduced. Accordingly, the display device 1000 with improved reliability may be provided.

In the active area 1000A (see FIG. 1) according to an embodiment of the present disclosure, an area overlapping the external input 2000 (see FIG. 3) may be defined as the first area AA in a plan view, and an area that does not overlap the external input 2000 (see FIG. 3) in a plan view may be defined as the second area BB. That is, the first area AA may be an area where the external input 2000 (see FIG. 3) is detected, and the second area BB may be an area where the external input 2000 (see FIG. 3) is not detected.

The display device 1000 (see FIG. 1) may further include a multiplexer ("MP") connected between the readout line RL and the fingerprint controller ROC.

The plurality of readout lines RL may be present. The multiplexer MP may connect the plurality of readout lines RL to a pad wire PD electrically connected to the fingerprint controller ROC in a P:1 manner ('P' is an integer greater than or equal to 2) in response to a MUX control signal. In an embodiment, for example, the multiplexer MP may sequentially connect the 'P' readout lines RL to the one pad wire PD in response to the MUX control signal. The plurality of readout lines RL may be driven through the multiplexer MP in a time division method.

According to an embodiment of the present disclosure, as compared to a case where the plurality of readout lines RL are directly connected to the fingerprint controller ROC through the multiplexer MP, the pad wire PD reduced by 1/P may be electrically connected to the fingerprint controller ROC. The number of wires disposed in the peripheral area NDA of the display layer 100 may be reduced. Accordingly, it is possible to provide the display device 1000 (see FIG. 1) in which the area size of the peripheral area NDA is effectively reduced.

However, this is an example and the multiplexer MP according to an embodiment of the present disclosure may be omitted.

The sensing circuit DTC may output the switch signal GT-1 to the switch transistor ST4.

In response to the switch signal GT-1, the switch transistor ST4 of the first sensor FX1 may be turned on, and the switch transistor ST4 of the second sensor FX2 may be turned off.

The first sensor FX1 may be electrically connected to the fingerprint controller ROC. The biometric sensing signal FS generated by the first sensor FX1 may be output to the fingerprint controller ROC. On the basis of the biometric sensing signal FS obtained by the first sensor FX1, the fingerprint controller ROC may obtain biometric information of the external input 2000 provided to the first area AA.

According to an embodiment of the present disclosure, the fingerprint controller ROC may receive the biometric sensing signal FS from only the sensors overlapping the external input 2000 (see FIG. 3) on a plane among the plurality of sensors FX. As the number of readout lines RL sensed by the fingerprint controller ROC decreases, the time required for sensing the biometric sensing signal FS may be shortened. The time required to obtain biometric information may be effectively reduced. Accordingly, even though the sensing time increases when the display device 1000 is driven in a time division method while including the multiplexer MP, the total sensing time may be maintained or reduced. Accordingly, the display device 1000 with improved reliability may be provided.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, one lead-out line may be connected to a plurality of sensors. In an embodiment, for example one readout line may be electrically connected to two sensors, which are adjacent to each other in one row, through a third sensing node. Accordingly, the number of wires of the readout line may be reduced. The number of readout lines disposed in a peripheral area may be effectively reduced. Accordingly, it is possible to provide a display device having the reduced area size of the peripheral area.

Also, as described above, a fingerprint controller may be electrically connected to the readout lines. A sensor layer may generate a sensing signal by detecting an external input. A sensor controller may generate a switch signal based on the sensing signal. A switch transistor may provide a biometric sensing signal to a readout line based on the switch signal, and the biometric sensing signal may be provided to the fingerprint controller. That is, only a sensor to be operated may be driven by using the switch transistor. Accordingly, the fingerprint controller may receive a biometric sensing signal from only readout lines, which are electrically connected to a sensor to be operated, from among a plurality of readout lines. As the number of readout lines sensed by the fingerprint controller decreases, the time required for sensing the biometric sensing signal may be shortened. The time required to obtain biometric information may be effectively reduced. Accordingly, it is possible to provide a display device with improved reliability.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display layer; and
a sensor layer configured to sense an external input and disposed on the display layer,
wherein the display layer includes:
a plurality of pixels, each of which includes a light emitting element and a pixel driving circuit connected to the light emitting element; and
a plurality of sensors, each of which includes a sensing element and a sensor driving circuit connected to the sensing element,
wherein the sensor driving circuit includes:
a reset transistor including a first electrode for receiving a reset voltage, a second electrode connected to a first sensing node, and a third electrode for receiving a first scan signal;
an amplification transistor including a first electrode for receiving a first driving voltage, a second electrode connected to a second sensing node, and a third electrode connected to the first sensing node;
an output transistor including a first electrode connected to the second sensing node, a second electrode connected to a sub-readout line, and a third electrode for receiving a second scan signal; and
a switch transistor including a first electrode connected to the sub-readout line, a second electrode connected to a readout line, and a third electrode for receiving a switch signal generated based on the external input,
wherein one readout line is shared as the readout line for at least two sensors among the plurality of sensors.

2. The display device of claim 1, wherein the sensor layer includes a plurality of first sensing electrodes and a plurality of second sensing electrodes crossing the plurality of first sensing electrodes,
further comprising:
a sensor controller configured to drive the sensor layer and including a signal generation circuit configured to transmit a transfer signal to the plurality of first sensing electrodes, an input detection circuit configured to receive a sensing signal from the plurality of second sensing electrodes, and a sensor control circuit.

3. The display device of claim 2, wherein the sensor controller generates the switch signal based on the sensing signal, and
wherein the sensor controller outputs the switch signal to the switch transistor.

4. The display device of claim 2, wherein the sensor controller senses the external input based on the sensing signal, and
wherein, in a plan view, the switch transistor included in each of sensors, which overlap the external input, from among the plurality of sensors is turned on in response to the switch signal.

5. The display device of claim 4, wherein, in the plan view, the switch transistor included in each of sensors, which do not overlap the external input, from among the plurality of sensors is turned off in response to the switch signal.

6. The display device of claim 4, further comprising:
a driving controller configured to drive the display layer,
wherein the driving controller controls pixels, which overlap the external input, of the plurality of pixels to emit light.

7. The display device of claim 2, wherein an active area, in which the plurality of pixels is disposed, and a peripheral area adjacent to the active area are defined in the display layer,
further comprising:
a sensing circuit disposed in the peripheral area,
wherein the sensing circuit generates the switch signal based on the sensing signal, and
wherein the sensing circuit outputs the switch signal to the switch transistor.

8. The display device of claim 1, wherein the display layer further includes:
a fingerprint controller electrically connected to the plurality of sensors; and
a multiplexer connected between the plurality of readout lines and the fingerprint controller.

9. The display device of claim 1, wherein the pixel driving circuit includes:
a first transistor connected between the light emitting element and a first voltage line for receiving the first driving voltage;
a second transistor connected between a data line and a first electrode of the first transistor and configured to receive the second scan signal;
a third transistor connected between a second electrode of the first transistor and a first node and configured to receive the first scan signal; and
a fourth transistor connected between the first node and an initialization voltage line and configured to receive a third scan signal, and
wherein the third transistor and the fourth transistor have a transistor type different from a transistor type of the first transistor and the second transistor.

10. The display device of claim 9, wherein the reset transistor has a transistor type identical to the transistor type of the third transistor and the fourth transistor.

11. The display device of claim 10, wherein each of the third transistor, the fourth transistor, and the reset transistor is an NMOS transistor, and
wherein each of the first transistor, the second transistor, the amplification transistor, and the output transistor is a PMOS transistor.

12. The display device of claim 10, wherein each of the third transistor, the fourth transistor, and the reset transistor is an oxide semiconductor transistor, and
wherein each of the first transistor, the second transistor, the amplification transistor, and the output transistor is a low-temperature polycrystalline silicon (LTPS) transistor.

13. The display device of claim 1, wherein the light emitting element is an organic light emitting diode, and
wherein the sensing element is an organic photodiode.

14. A driving method of a display device, the method comprising:
providing the display device including a display layer including a plurality of pixels and a plurality of sensors, a sensor layer disposed on the display layer, a sensor controller configured to drive the sensor layer, and a fingerprint controller;
sensing, by the sensor layer, an external input;
sensing, by the sensor controller, a location of the external input;
generating, by the sensor controller, a switch signal based on the location;
outputting, by the sensor controller, the switch signal to the plurality of sensors such that only sensors that overlap the external input, from among the plurality of sensors, are turned on by the switch signal;
electrically connecting a part of the plurality of sensors to the fingerprint controller based on the switch signal; and
obtaining, by the part of the plurality of sensors, biometric information of the external input.

15. The method of claim 14, wherein each of the plurality of sensors includes a sensing element and a sensor driving circuit connected to the sensing element, and
wherein the sensor driving circuit includes:
a reset transistor including a first electrode for receiving a reset voltage, a second electrode connected to a first sensing node, and a third electrode for receiving a first scan signal;
an amplification transistor including a first electrode for receiving a first driving voltage, a second electrode connected to a second sensing node, and a third electrode connected to the first sensing node;
an output transistor including a first electrode connected to the second sensing node, a second electrode connected to a sub-readout line, and a third electrode for receiving a second scan signal; and
a switch transistor including a first electrode connected to the sub-readout line, a second electrode connected to a readout line, and a third electrode for receiving the switch signal.

16. The method of claim 15, wherein the obtaining of the biometric information includes:
a sensor initialization step in which the reset transistor is turned on;
a sensor active step in which the sensing element receives light reflected from the external input; and
a sensor sensing step in which the amplification transistor and the output transistor are turned on and a biometric sensing signal is provided to the readout line.

17. The method of claim 15, wherein the electrically connecting of the part of the plurality of sensors to the fingerprint controller includes:
in a plan view, turning on the switch transistor included in each of sensors, which overlap the external input, from among the plurality of sensors in response to the switch signal.

18. The method of claim 14, wherein the sensor layer includes a plurality of first sensing electrodes and a plurality of second sensing electrodes crossing the plurality of first sensing electrodes, and
wherein the sensing, by the sensor layer, of the external input includes:
transmitting a transfer signal to the plurality of first sensing electrodes; and
receiving a sensing signal from the plurality of second sensing electrodes.

19. The method of claim 18, wherein the sensing, by the sensor controller, of the location of the external input includes:
calculating the location based on the sensing signal.

* * * * *